United States Patent
Ren et al.

(10) Patent No.: US 10,924,244 B2
(45) Date of Patent: Feb. 16, 2021

(54) CHANNEL STATE INFORMATION FEEDBACK METHOD AND APPARATUS

(71) Applicant: Huawei Technologies Co., Ltd., Guangdong (CN)

(72) Inventors: Haibao Ren, Shanghai (CN); Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 60 days.

(21) Appl. No.: 16/188,159

(22) Filed: Nov. 12, 2018

(65) Prior Publication Data

US 2019/0081760 A1   Mar. 14, 2019

Related U.S. Application Data

(63) Continuation of application No. PCT/CN2017/084004, filed on May 11, 2017.

(30) Foreign Application Priority Data

May 13, 2016 (CN) .......................... 201610319325.5

(51) Int. Cl.
*H04W 72/04* (2009.01)
*H04L 5/00* (2006.01)
(Continued)

(52) U.S. Cl.
CPC .......... *H04L 5/0053* (2013.01); *H04L 1/0026* (2013.01); *H04L 1/0027* (2013.01);
(Continued)

(58) Field of Classification Search
CPC ....... H04L 5/0053; H04L 5/00; H04L 5/0057; H04L 5/0091; H04L 5/0055;
(Continued)

(56) References Cited

U.S. PATENT DOCUMENTS

2012/0113909 A1*  5/2012  Jen ............................ H04L 1/16
                                                              370/329
2013/0100919 A1*  4/2013  Han .................. H04W 72/0413
                                                              370/329
(Continued)

FOREIGN PATENT DOCUMENTS

CN    102437901 A    5/2012
CN    104735691 A    6/2015
(Continued)

OTHER PUBLICATIONS

ZTE: "Consideration on muiti-antenna transmission for PUCCH Format 2 in LTE-A", 3GPP DRAFT; R1-100786, vol. RAN WG1, Jan. 21, 2010, 5 pages.
(Continued)

*Primary Examiner* — Hassan Kizou
*Assistant Examiner* — Mahbubul Bar Chowdhury
(74) *Attorney, Agent, or Firm* — Kilpatrick Townsend & Stockton LLP

(57) ABSTRACT

This application relates to the mobile communications field, and in particular, to a channel state information (CSI) feedback technology in a wireless communications system. In a CSI feedback method, a network device allocates, for a feedback of one piece of CSI of user equipment, a physical uplink control channel resource including two physical resource block (PRB) pairs, and the user equipment uses a low bit-rate modulation and coding scheme for a CSI bit, and sends CSI on the physical uplink control channel resource.

15 Claims, 9 Drawing Sheets

(51) Int. Cl.
*H04W 72/08* (2009.01)
*H04L 1/00* (2006.01)
H04L 1/02 (2006.01)
H04L 1/16 (2006.01)
H04B 7/00 (2006.01)

(52) U.S. Cl.
CPC .............. *H04L 1/0073* (2013.01); *H04L 5/00* (2013.01); *H04L 5/0057* (2013.01); *H04W 72/0446* (2013.01); *H04W 72/08* (2013.01); H04B 7/00 (2013.01); H04L 1/0057 (2013.01); H04L 1/02 (2013.01); H04L 1/1657 (2013.01); H04L 5/0055 (2013.01); H04L 5/0091 (2013.01)

(58) Field of Classification Search
CPC ... H04L 1/0026; H04L 1/0027; H04L 1/0073; H04L 1/1657; H04L 1/02; H04L 1/0057; H04W 72/08; H04W 72/0446; H04B 7/00
See application file for complete search history.

(56) References Cited

U.S. PATENT DOCUMENTS

| | | | |
|---|---|---|---|
| 2013/0121270 A1* | 5/2013 | Chen | H04L 5/001 370/329 |
| 2015/0003379 A1 | 1/2015 | Han et al. | |
| 2015/0092702 A1 | 4/2015 | Chen et al. | |
| 2015/0358124 A1 | 12/2015 | Suzuki et al. | |
| 2016/0192388 A1* | 6/2016 | Ekpenyong | H04W 72/1284 370/329 |
| 2016/0295574 A1* | 10/2016 | Papasakellariou | H04W 52/146 |
| 2016/0337874 A1 | 11/2016 | Yang et al. | |
| 2018/0124775 A1* | 5/2018 | Seo | H04L 1/18 |

FOREIGN PATENT DOCUMENTS

| | | |
|---|---|---|
| CN | 104836641 A | 8/2015 |
| CN | 104995978 A | 10/2015 |
| EP | 2955870 A1 | 12/2015 |

OTHER PUBLICATIONS

Huawei et al., "On CA enhancements supporting up to 32 component carriers", 3GPP TSG RAN WG1 Meeting #80, R1-150390, Feb. 2015, 9 pages.
"3rd Generation Partnership Project; Technical Specification Group Radio Access Network; Evolved Universal Terrestrial Radio Access (E-UTRA); Multiplexing and channel coding (Release 12)", 3GPP TS 36.212 V12.4.0, Mar. 2015, 94 pages.
Huawei et al., "CSI feedback enhancement for carrier aggregation enhancement beyond 5 carriers", 3GPP TSG RAN WG1 Meeting #80, R1-150412, Feb. 2015, 2 pages.
"3rd Generation Partnership Project; Technical Specification Group Radio Access Network; Evolved Universal Terrestrial Radio Access (E-UTRA); Physical channels and modulation (Release 12)," 3GPP TS 36.211 V12.5.0, Mar. 2015, 136 pages.
"3rd Generation Partnership Project; Technical Specification Group Radio Access Network; Evolved Universal Terrestrial Radio Access (E-UTRA); Further advancements for E-UTRA physical layer aspects (Release 9)", 3GPP TR 36.814 V9.0.0, Mar. 2010, 104 pages.
ZTE, "Consideration on multi-antenna transmission for PUCCH Format 2 in LTE-A", 3GPP TSG RAN WG1, Jan. 18-22, 2010, 5 pages, R1-100786.

* cited by examiner

CHANNEL STATE INFORMATION FEEDBACK METHOD AND APPARATUS

CROSS-REFERENCE TO RELATED APPLICATIONS

This application is a continuation of International Application No. PCT/CN2017/084004, filed on May 11, 2017, which claims priority to Chinese Patent Application No. 201610319325.5, filed on May 13, 2016. The disclosures of the aforementioned applications are hereby incorporated by reference in their entireties.

TECHNICAL FIELD

This application relates to the mobile communications field, and in particular, to a channel state information (CSI) feedback technology in a wireless communications system.

BACKGROUND

In a mobile communication scenario, a radio channel condition usually constantly changes. As the radio channel condition changes, user equipment (UE) needs to promptly adjust an modulation and coding scheme (MCS) used in uplink and downlink transmission, to more efficiently use radio resources. For downlink transmission, to better adapt to a radio channel change, the UE may report downlink channel quality information to a network device by using channel state information (CSI), so that the network device selects a more reliable MCS and a better time-frequency resource for the UE. The CSI includes a plurality of types of information. For example, in an Long Term Evolution (LTE) system, the CSI mainly includes an rank indication (RI), a precoding matrix indicator (PMI), and a channel quality indicator (CQI). The network device may learn, based on the information reported by using the CSI, information recommended or measured by the UE, such as a transmission order and a precoding matrix that can be used for downlink transmission and a highest MCS that can be used in a current downlink channel quality condition, and allocates a proper MCS and a proper time-frequency resource to the UE based on the information. It can be learned that whether the network device can correctly receive a CSI fed back by the UE may directly affect downlink data transmission quality and downlink resource utilization.

In some scenarios in which uplink channel quality is relatively poor, coverage and receiving quality of an uplink control channel need to be improved to ensure that the CSI is correctly received. Development of wireless communications technologies brings more scenarios in which uplink control channel coverage needs to be enhanced. For example, in a high-frequency mobile communications network, more reliable uplink control channel transmission is required because attenuation of a high frequency band radio signal is faster. In a distributed coordinated multipoint scenario, when a plurality of distributed base stations perform coordinated scheduling, another base station needs to obtain channel state information of a served user. If information is exchanged by using an IP network between the base stations, a long delay may be caused, and system performance deteriorates. In this case, uplink control channel coverage also needs to be enhanced, so that a plurality of surrounding base stations simultaneously receive the CSI sent by the UE. This reduces a delay in obtaining the CSI of the UE by a neighboring cell, and improves the system performance. Therefore, a solution for improving CSI feedback reliability and coverage is required to ensure correct CSI receiving, thereby ensuring downlink data transmission reliability.

SUMMARY

This specification describes a channel state information (CSI) feedback method, an apparatus, and a system, so as to improve CSI feedback reliability and coverage and ensure downlink data transmission reliability.

According to a first aspect, an embodiment of this application provides a CSI feedback method, including: sending, by a network device, a configuration message to user equipment, where the configuration message includes information about a physical uplink control channel resource that is configured for feeding back each piece of CSI of the user equipment and that includes more than one physical resource block (PRB) pair, the PRB pair is two PRBs that are distributed in two consecutive timeslots and that are used to transmit a physical uplink control channel, and each of the timeslots includes one of the two PRBs; and receiving, by the network device, CSI sent by the user equipment on the physical uplink control channel resource. Optionally, the configuration message includes information about a physical uplink control channel resource that is configured for feeding back each piece of CSI of the user equipment and that includes two physical resource block (PRB) pairs. Optionally, the configuration message may be an existing message in the prior art that includes the information about the physical uplink control channel resource, or may be a new message that includes the information about the physical uplink control channel resource. More physical uplink control channel resources are allocated for a CSI feedback, so that a more robust low bit-rate coding or modulation scheme can be used for CSI to improve CSI transmission reliability and CSI transmission coverage. The physical uplink control channel is mainly used to carry uplink control information, for example, a physical uplink control channel (PUCCH) and another uplink channel that is defined with network evolution and that has the foregoing function.

With reference to the first aspect, in a first possible implementation, the method further includes: demodulating, by the network device, each piece of CSI that is modulated into more than 10 symbols, or the CSI and a HARQ acknowledgement message that are modulated into more than 10 symbols. Optionally, the network device demodulates each piece of CSI that is modulated into 20 symbols, or the CSI and a HARQ acknowledgement message that are modulated into 20 symbols. Optionally, the 20 symbols may be quadrature phase shift keying (QPSK) symbols.

With reference to the first aspect or the first possible implementation of the first aspect, in a second possible implementation, the method further includes: decoding, by the network device, each piece of CSI on which coding is performed or the CSI and the HARQ acknowledgement message on which coding is performed. Optionally, the coding may be RM (40, K), RM (40, K) is a Reed-Muller coding scheme, and K is an integer greater than 0. An original information bit of one piece of CSI is coded to obtain 40 coded bits, or one piece of CSI and the HARQ acknowledgement message are jointly coded to obtain 40 coded bits, and the 40 coded bits are finally modulated into 20 symbols. This reduces a bit rate for CSI coding and improves coding robustness, so that CSI can be correctly transmitted in a harsher channel environment or a larger coverage area. It can be understood that the coding may be another coding scheme in the prior art, and another quantity of bits may be obtained after the coding. For example, the CSI or the CSI and the HARQ acknowledgement message may be coded into 80 bits by using the another coding scheme in the prior art, and then the 80 bits are modulated into 40 QPSK symbols. A physical resource that can carry the 40 QPSK symbols is correspondingly allocated for transmission. A specific coding scheme, a specific quantity of bits generated after the coding, a quantity of symbols obtained after the modulation, and a quantity of required physical resources are not limited in this application.

With reference to the first aspect or the first or the second possible implementation of the first aspect, in a third possible implementation, before each piece of modulated CSI or the modulated CSI and the modulated HARQ acknowledgement message are demodulated, the method further includes: despreading spread symbols.

With reference to any one of the first aspect or the first to the third possible implementations of the first aspect, in a fourth possible implementation, before each piece of CSI or the CSI and the HARQ acknowledgement message are decoded, the method further includes: descrambling scrambled coded data.

With reference to any one of the first aspect or the first to the fourth possible implementations of the first aspect, in a fifth possible implementation, the network device receives half of the symbols of one piece of CSI or half of the symbols of the CSI and the HARQ acknowledgement message on one of the PRB pairs. For example, 10 symbols of CSI modulated into 20 QPSK symbols are received on one of the PRB pairs, and the other 10 QPSK symbols of the CSI are received on the other PRB pair.

With reference to any one of the first aspect or the first to the fifth possible implementations of the first aspect, in a sixth possible implementation, that the configuration message includes information about a physical uplink control channel resource that is configured for feeding back each piece of CSI of the user equipment and that includes two PRB pairs includes one of the following cases: the configuration message includes two first physical uplink control channel resource indexes configured by the network device for feeding back each piece of CSI; and the configuration message includes one second physical uplink control channel resource index configured by the network device for feeding back each piece of CSI. One of the first physical uplink control channel resource indexes indicates one PRB pair, and the second physical uplink control channel resource index indicates two PRB pairs. When a physical uplink control channel resource is added for a single user equipment, configuration of a plurality of first physical uplink control channel resource indexes can not only improve CSI transmission reliability when required, but also maintain a correspondence between a resource index and a physical resource in the prior art, and a user terminal in the prior art can be used.

With reference to the sixth possible implementation of the first aspect, in a seventh possible implementation, the method further includes: sending, by the network device, type information of a physical uplink control channel resource index to the user equipment, where the type information of the physical uplink control channel resource index is used to indicate a type of a physical uplink control channel resource index used in the configuration message.

With reference to the sixth or the seventh possible implementation of the first aspect, in an eighth possible implementation, two PRB pairs indicated by the two first physical uplink control channel resource indexes that are configured for feeding back each piece of CSI are distributed in two same consecutive timeslots or distributed in two different consecutive timeslots.

With reference to any one of the sixth to the eighth possible implementations of the first aspect, in a ninth possible implementation, the method further includes: sending, by the network device, first indication information to the user equipment, where the first indication information is used to indicate a distribution manner of the two PRB pairs indicated by the two first physical uplink control channel resource indexes that are configured for feeding back each piece of CSI.

According to a second aspect, an embodiment of this application provides a CSI feedback method, including: receiving, by user equipment, a configuration message sent by a network device, where the configuration message includes information about a physical uplink control channel resource that is configured for feeding back each piece of CSI of the user equipment and that includes more than one physical resource block (PRB) pair, the PRB pair is two PRBs that are distributed in two consecutive timeslots and that are used to transmit a physical uplink control channel, and each of the timeslots includes one of the two PRBs; and sending, by the user equipment, CSI on the physical uplink control channel resource. Optionally, the configuration message includes information about a physical uplink control channel resource that is configured for feeding back each piece of CSI of the user equipment and that includes two physical resource block (PRB) pairs. Optionally, the configuration message may be an existing message in the prior art that includes the information about the physical uplink control channel resource, or may be a new message that includes the information about the physical uplink control channel resource.

With reference to the second aspect, in a first possible implementation, the user equipment performs coding on an original bit of each piece of CSI, or performs coding on an original bit of the CSI and an original bit of a HARQ acknowledgement message. Optionally, the coding may be RM (40, K) coding, RM (40, K) is a Reed-Muller coding scheme, and K is an integer greater than 0.

With reference to the second aspect or the first possible implementation of the second aspect, in a second possible implementation, the user equipment modulates the coded CSI or the coded CSI and the coded HARQ acknowledgement message into more than 10 symbols. Optionally, the user equipment modulates the coded CSI or the coded CSI and the coded HARQ acknowledgement message into 20 symbols. Optionally, the symbols may be quadrature phase shift keying (QPSK) symbols. It can be understood that the coding in the first possible implementation of the second aspect may be another coding scheme in the prior art, and another quantity of bits may be obtained after the coding. For example, the CSI or the CSI and the HARQ acknowledgement message may be coded into 80 bits by using the another coding scheme in the prior art, and then the 80 bits are modulated into 40 QPSK symbols. A physical resource that can carry the 40 QPSK symbols is correspondingly allocated for transmission. A specific coding scheme, a specific quantity of bits generated after the coding, a quantity of symbols obtained after the modulation, and a quantity of required physical resources are not limited in this application.

With reference to the second aspect or the first or the second possible implementation of the second aspect, in a third possible implementation, after the original bit of each piece of CSI, or the original bit of the CSI and the original bit of the HARQ acknowledgement message are coded, the method further includes: scrambling coded data generated after the coding.

With reference to any one of the second aspect or the first to the third possible implementations of the second aspect, in a fourth possible implementation, after each piece of CSI or the CSI and the HARQ acknowledgement message are modulated, the method further includes: spreading modulation symbols.

With reference to any one of the second aspect or the first to the fourth possible implementations of the second aspect, in a fifth possible implementation, the user equipment sends half of the symbols of one piece of CSI or half of the symbols of the CSI and the HARQ acknowledgement message on one of the PRB pairs.

With reference to any one of the second aspect or the first to the fifth possible implementations of the second aspect, in a sixth possible implementation, that the configuration message includes information about a physical uplink control channel resource that is configured for feeding back each piece of CSI of the user equipment and that includes two PRB pairs includes one of the following cases: the configuration message includes two first physical uplink control channel resource indexes configured for feeding back each piece of CSI; and the configuration message includes one second physical uplink control channel resource index configured for feeding back each piece of CSI. One of the first physical uplink control channel resource indexes indicates one PRB pair, and the second physical uplink control channel resource index indicates two PRB pairs.

With reference to the sixth possible implementation of the second aspect, in a seventh possible implementation, the method further includes: receiving, by the user equipment, type information that is of a physical uplink control channel resource index and that is sent by the network device, where the type information of the physical uplink control channel resource index is used to indicate a type of a physical uplink control channel resource index used in the configuration message.

With reference to the sixth or the seventh possible implementation of the second aspect, in an eighth possible implementation, two PRB pairs indicated by the two first physical uplink control channel resource indexes that are configured for feeding back each piece of CSI are distributed in two same consecutive timeslots or distributed in two different consecutive timeslots.

With reference to any one of the sixth to the eighth possible implementations of the second aspect, in a ninth possible implementation, the method further includes: receiving, by the user equipment, first indication information sent by the network device, where the first indication information is used to indicate a distribution manner of the two PRB pairs indicated by the two first physical uplink control channel resource indexes that are configured for feeding back each piece of CSI.

According to a third aspect, an embodiment of this application provides a network device, and the network device has a function of implementing actual actions of the network device in the foregoing method. The function may be implemented by using hardware, or may be implemented by using hardware executing corresponding software. The hardware or the software includes one or more modules corresponding to the function.

According to a fourth aspect, an embodiment of this application provides user equipment, and the user equipment has a function of implementing actual actions of the user equipment in the foregoing method. The function may be implemented by using hardware, or may be implemented by using hardware executing corresponding software. The hardware or the software includes one or more modules corresponding to the function.

According to a fifth aspect, an embodiment of this application provides a network device, and a structure of the network device includes a transmitter and a receiver. The transmitter and the receiver are configured to support communication between the network device and user equipment. The transmitter is configured to send information or data in the foregoing method to the user equipment. The receiver is configured to support the network device in receiving information or data sent by the user equipment in the foregoing method. In a possible implementation, the structure of the network device may further include a demodulator and/or a decoder. The demodulator is configured to demodulate or despread and demodulate the information or the data in the foregoing method. The decoder is configured to decode or descramble and decode the information or the data in the foregoing method. In a possible implementation, the structure of the network device may further include a processor. The processor is configured to support the network device in performing a corresponding function in the foregoing method. It can be understood that when the structure of the network device does not include the demodulator and/or the decoder, functions of the demodulator and/or the decoder may be alternatively completed by the receiver or the processor. The network device may further include a memory. The memory is configured to couple with the processor, and store a program instruction and data that are necessary for the network device. The network device may further include an interface unit, configured to support communication with another network device, for example, communication with a core network node.

According to a sixth aspect, an embodiment of this application provides user equipment, and a structure of the user equipment includes a receiver and a transmitter. The transmitter is configured to support the user equipment in sending information or data in the foregoing method to a network device. The receiver is configured to support the user equipment in receiving information or data sent by the network device in the foregoing method. In a possible implementation, the structure of the user equipment may further include an encoder and/or a modulator. The encoder is configured to code or code and scramble the information or the data in the foregoing method. The modulator is configured to modulate or modulate and spread the information or the data in the foregoing method. In a possible implementation, the user equipment may further include a processor. The processor is configured to support the user equipment in performing a corresponding function in the foregoing method. It can be understood that when the structure of the user equipment does not include the modulator and/or the encoder, functions of the modulator and/or the encoder may be alternatively completed by the transmitter or the processor. The user equipment may further include a memory. The memory is configured to couple with the processor, and store a program instruction and data that are necessary for the user equipment.

According to a seventh aspect, an embodiment of this application provides a communications system, and the system includes the network device and the user equipment described in the foregoing aspects.

According to an eighth aspect, an embodiment of this application provides a computer storage medium, configured to store a computer software instruction used by the foregoing network device. The computer software instruction includes a program designed to execute the foregoing aspect.

According to a ninth aspect, an embodiment of this application provides a computer storage medium, configured to store a computer software instruction used by the foregoing user equipment. The computer software instruction includes a program designed to execute the foregoing aspect.

Compared with the prior art, the solutions provided in this application aim to improve CSI feedback reliability and coverage by occupying more physical resources, so as to ensure correct CSI receiving, thereby ensuring downlink data transmission reliability.

DESCRIPTION OF EMBODIMENTS

A network architecture and a service scenario described in the embodiments of this application are intended to describe the technical solutions in the embodiments of this application more clearly, but are not intended to limit the technical solutions provided in the embodiments of this application. A person of ordinary skill in the art may learn that as the network architecture evolves and a new service scenario emerges, the technical solutions provided in the embodiments of this application are also applicable to a similar technical problem.

Technologies described in this application can be applied to an Long Term Evolution (LTE) system, a subsequent evolved system such as 5th Generation Mobile Communication (5G), or other wireless communications systems using various radio access technologies, for example, systems using access technologies such as Code Division Multiple Access, Frequency Division Multiple Access, Time Division Multiple Access, orthogonal frequency division multiple access, and single carrier frequency division multiple access, and are particularly applicable to a scenario in which uplink control channel coverage needs to be enhanced or uplink control channel receiving quality needs to be improved, for example, a high-frequency wireless communications network and a wireless communications system using a distributed coordinated multipoint technology.

Figure 1:
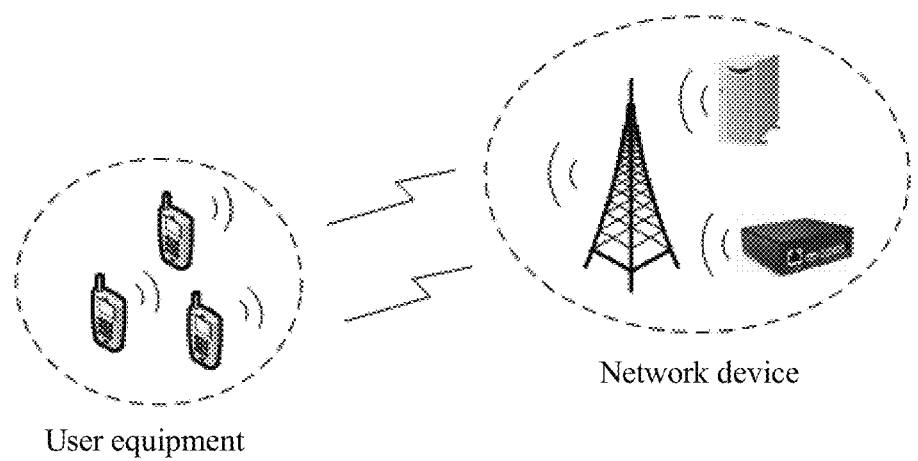
FIG. 1 is a schematic diagram of a possible application scenario of this application.

As shown in FIG. 1, FIG. 1 is a schematic diagram of a possible application scenario of this application. User equipment (UE) accesses a network device by using a wireless interface for communication, and may perform communication with another user equipment, for example, communication in a device-to-device (D2D) scenario or an machine-to-machine (M2M) scenario. The network device may communicate with the user equipment, and may perform communication with another network device, for example, communication between a macro base station and an access point.

Figure 2:
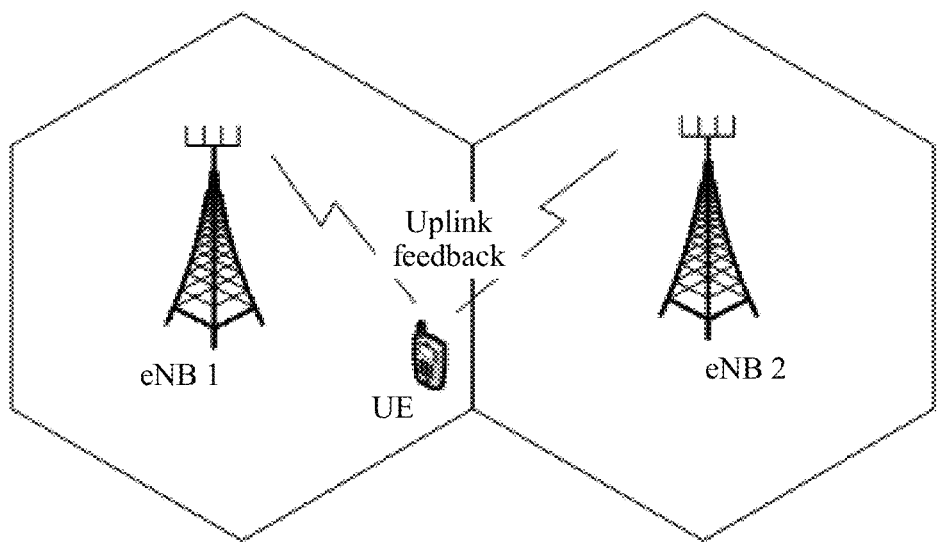
FIG. 2 is a schematic diagram of another possible application scenario of this application.

As shown in FIG. 2, FIG. 2 is a schematic diagram of another possible application scenario of this application. A network shown in the figure uses a distributed coordinated multipoint technology. For example, in an LTE network, a plurality of eNBs perform coordinated scheduling, and channel state information (CSI) fed back by UE on an uplink channel may be simultaneously received by a serving cell eNB and a coordinated cell eNB that are of the UE. Specifically, as shown in FIG. 2, an eNB 1 is a serving cell base station of the UE, and an eNB 2 is a coordinated cell base station of the UE. Both the eNB 1 and the eNB 2 need to receive the CSI fed back by the UE.

In this application, nouns "network" and "system" are usually interchangeably used, but meanings of the nouns can be understood by a person skilled in the art. The user equipment in this application may include a handheld device, an in-vehicle device, a wearable device, a computing device, or a control device that has a wireless communications function; another processing device connected to a wireless modem; or user equipment (UE) in various forms, including a mobile station (MS), a terminal, terminal equipment, and the like. For ease of description, in this application, all the devices mentioned above are referred to as user equipment or UE. The network device in this application includes a base station (BS), a network controller, a mobile switching center, or the like. An apparatus that directly communicates with the user equipment on a radio channel is usually the base station. The base station may include various forms of macro base stations, micro base stations, relay stations, access points, remote radio units (RRU), or the like. Certainly, another network device having the wireless communications function may also perform wireless communication with the user equipment. This is not limited in this application. A device having a base station function may have different names in systems using different radio access technologies. For example, the device is referred to as an evolved NodeB (eNB or eNodeB) in an LTE network, and is referred to as a NodeB in a 3rd Generation (3G) network.

Figure 3:
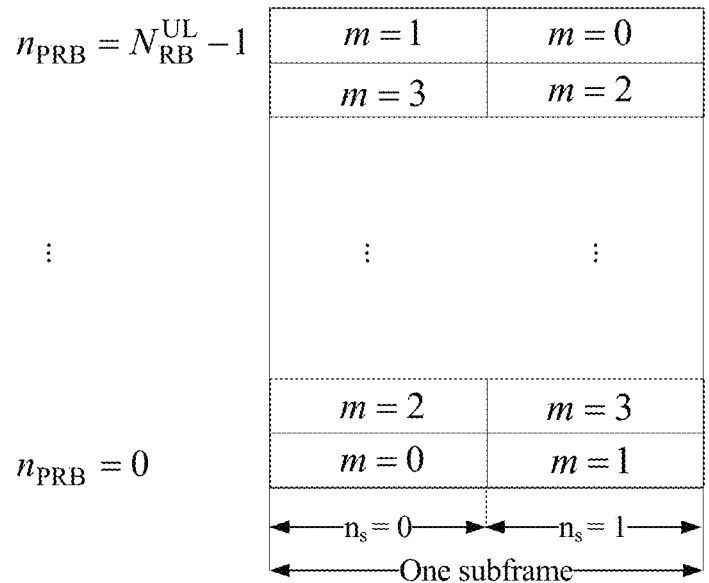
FIG. 3 is a schematic diagram of a possible manner of mapping a physical uplink control channel resource in this application.

FIG. 3 shows a possible manner of mapping a physical uplink control channel resource in this application. An LTE system is used as an example. The 3rd Generation Partnership Project (3GPP) TS 36.211 protocol standardizes a manner of mapping a physical resource of a physical uplink control channel (PUCCH) in the LTE system. Specifically, with reference to FIG. 3, the LTE system is used as an example, and each block represents one physical resource block (PRB). One PRB includes one timeslot (slot) in time domain and $N_{sc}^{RB}$ (usually, $N_{sc}^{RB}=12$ in the existing LTE system) subcarriers in frequency domain. $n_{PRB}$ is a PRB number, and $N_{RB}^{UL}$ is a total quantity of PRBs included in uplink bandwidth in the system. A number of a PRB used to send the PUCCH in a slot $n_s$ is determined by using the following formula:

$$n_{PRB} = \begin{cases} \lfloor \frac{m}{2} \rfloor & \text{if } (m+n_S \bmod 2) \bmod 2 = 0 \\ N_{RB}^{UL} - 1 - \lfloor \frac{m}{2} \rfloor & \text{if } (m+n_S \bmod 2) \bmod 2 = 1 \end{cases}.$$

In the formula, $n_s=0, 1, 2 \ldots 19$ indicates a timeslot number. Specifically, PUCCH formats 2/2a/2b (PUCCH format 2/2a/2b) are used as an example, $m=\lfloor n_{PUCCH}^{(2,\tilde{p})}/N_{sc}^{RB} \rfloor$ (a symbol $\lfloor \ \rfloor$ indicates a round-down operation), $n_{PUCCH}^{(2,\tilde{p})}$ is a PUCCH formats 2/2a/2b resource index allocated to UE, a superscript 2 indicates that the resource index is a resource index for the PUCCH formats 2/2a/2b, and a superscript $\tilde{p}$ is an antenna port index. $n_{PUCCH}^{(2,\tilde{p})}$ may be configured by using a cqi-PUCCH-ResourceIndex field in a UE-level radio resource control (RRC) configuration parameter information element (IE) CQI-ReportPeriodic. According to the foregoing rule, for example, one subframe includes two timeslots, and physical resources used by the PUCCH when m is equal to 0, 1, 2, and 3 in a subframe including two consecutive timeslots $n_s=0, 1$ are identified in FIG. 3. Two PRBs corresponding to a same m value in two timeslots in one subframe are referred to as one PRB pair in this application.

In the LTE system, the UE may feed back CSI on two types of physical uplink channels: a physical uplink control channel PUCCH and a physical uplink shared channel (PUSCH). A CSI feedback includes a periodic CSI feedback and an aperiodic CSI feedback. Usually, the periodic CSI feedback is performed by using the PUCCH, and the aperiodic CSI feedback is performed by using the PUSCH. The PUCCH used for the periodic CSI feedback is a PUCCH of a type 2/2a/2b, which is usually referred to as a PUCCH format 2/2a/2b (PUCCH formats 2/2a/2b). Specific differences among these three types of PUCCHs are described as follows:

PUCCH format 2: In a case of a normal cyclic prefix (normal CP), only 20-bit coded CSI is carried, and QPSK modulation is used. In a case of an extended cyclic prefix (extended CP), CSI and hybrid automatic repeat request (HARQ) acknowledgement (ACK)/negative acknowledgement (NACK) message that are jointly coded are carried, 20-bit coded data is generated after the joint coding, and QPSK modulation is used.

PUCCH format 2a: Only a normal CP is supported, and 20-bit coded CSI (QPSK modulation) and 1-bit coded ACK/NACK message (BPSK (Binary Phase Shift Keying, binary phase shift keying) modulation) are carried.

PUCCH format 2b: Only a normal CP is supported, 20-bit coded CSI and 2-bit coded ACK/NACK message are carried, and QPSK modulation is used for both the CSI and the ACK/NACK message.

The normal CP is a frame structure in LTE. A cyclic prefix that is corresponding to an orthogonal frequency division multiplexing (OFDM) symbol and that is included in the normal CP is a normal value. The extended CP is another frame structure in LTE. A cyclic prefix that is corresponding to an OFDM symbol and that is included in the extended CP is an extended value. A length of the extended cyclic prefix is greater than a length of the normal cyclic prefix.

Usually, the UE codes, scrambles, modulates, and spreads an original bit of information carried on a physical uplink control channel, maps a symbol obtained after the spreading to a physical resource, performs inverse fast Fourier transformation (IFFT) on the mapped symbol to generate an single carrier frequency division multiple access (SC-FDMA) baseband signal, performs processing such as intermediate radio frequency processing on the baseband signal, and then sends the processed baseband signal by using an antenna. A network device receives, by using the antenna, a radio frequency signal carrying physical uplink control channel information, performs operations such as fast Fourier transformation (FFT), equalization, despreading, demodulation, descrambling, and decoding on the radio frequency signal, and finally obtains the original bit of the information carried on the physical uplink control channel. It should be noted that the foregoing processes of sending, receiving, and processing the physical uplink control channel are merely used as an example for description. Based on different systems or scenarios, or according to different sending or receiving algorithms, a sending process and a receiving process may not include one or more steps in the foregoing processes, or another processing process may be added. This is not limited in this application.

According to the solution provided in this embodiment of this application, a more robust low bit-rate modulation and coding scheme can be used for CSI by occupying more physical resources. This improves CSI feedback reliability and coverage to ensure correct CSI receiving, thereby ensuring downlink data transmission reliability. The following further describes the embodiments of this application in detail based on commonalities in this application that are described above.

Figure 4:
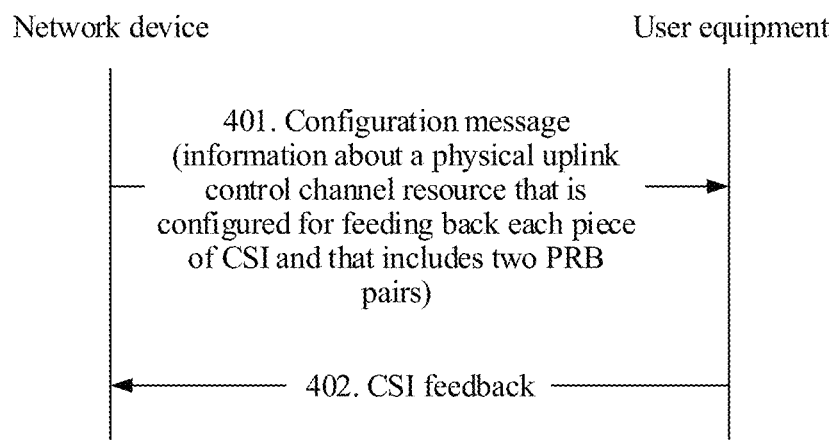
FIG. 4 is a schematic flowchart of a CSI feedback method according to an embodiment of this application.

FIG. 4 is a schematic flowchart of a CSI feedback method according to an embodiment of this application.

In a part 401, a network device sends a configuration message to UE, where the configuration message includes information about a physical uplink control channel resource that is configured for feeding back each piece of CSI of the user equipment and that includes two PRB pairs, the PRB pair is two PRBs that are distributed in two consecutive timeslots and that are used to transmit a physical uplink control channel, and each of the timeslots includes one of the two PRBs. More physical uplink control channel resources are allocated for a CSI feedback, so that a more robust low bit-rate modulation and coding scheme can be used for CSI to improve CSI transmission reliability and CSI transmission coverage. Optionally, the configuration message may be an existing message in the prior art that includes the information about the physical uplink control channel resource, or may be a new downlink message that includes the information about the physical uplink control channel resource. This is not limited in this application.

Figure 5A:
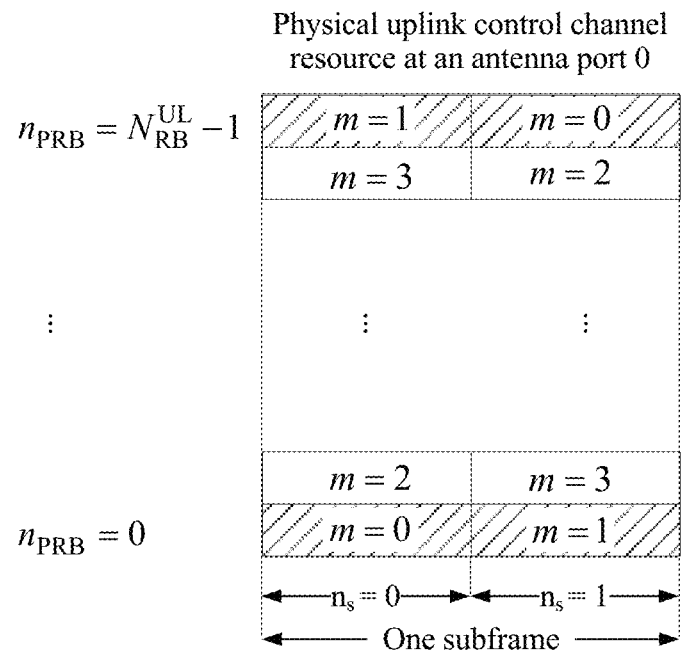
FIG. 5a and FIG. 5b are schematic diagrams of two manners of mapping a physical uplink control channel resource in a CSI feedback method according to an embodiment of this application.
Figure 5B:
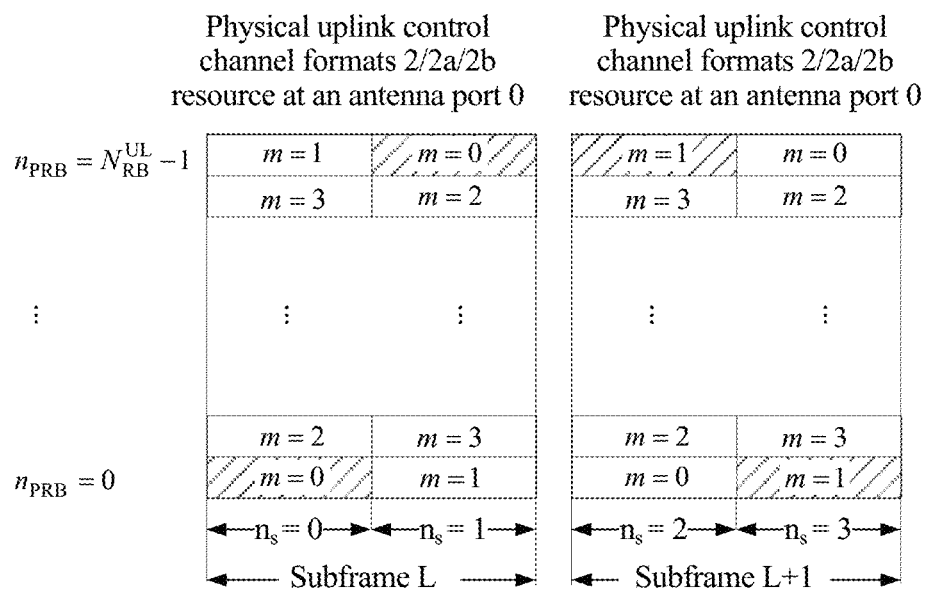

In an example, the configuration message includes two first physical uplink control channel resource indexes configured by the network device for feeding back each piece of CSI. Optionally, the configuration message includes two first physical uplink control channel resource indexes configured by the network device for feeding back one piece of CSI at an antenna port. One of the first physical uplink control channel resource indexes indicates one PRB pair. Specifically, an LTE network is used as an example. When the UE uses one antenna port to feed back CSI, the two resource indexes may be configured by using a cqi-PUCCH-ResourceIndex field in IE CQI-ReportPeriodic or a cqi-PUCCH-ResourceIndex-r10 field in CQI-ReportPeriodic-r10. In this case, the cqi-PUCCH-ResourceIndex field or the cqi-PUCCH-ResourceIndex-r10 field may be extended to an array format, such as $\{n_{PUCCH,0}^{(2,\tilde{p})}, n_{PUCCH}^{(2,\tilde{p})}\}$, where $n_{PUCCH,0}^{(2,\tilde{p})}$ indicates a first first physical uplink control channel resource index at an antenna port $\tilde{p}$, and $n_{PUCCH}^{(2,\tilde{p})}$ indicates a second first physical uplink control channel resource index at the antenna port $\tilde{p}$. Specifically, $\tilde{p}=0$ in this example. Alternatively, $n_{PUCCH,0}^{(2,\tilde{p})}$ and $n_{PUCCH}^{(2,\tilde{p})}$ may be respectively configured by using a cqi-PUCCH-ResourceIndex-r10 field and a cqi-PUCCH-ResourceIndexP1-r10 field in IE CQI-ReportPeriodic-r10. In this case, the network device may instruct the UE to obtain the resource indexes from the cqi-PUCCH-ResourceIndex-r10 field and the cqi-PUCCH-ResourceIndexP1-r10 field. With reference to FIG. 5a, when $n_{PUCCH,0}^{(2,\tilde{p})}=6$ and $n_{PUCCH,1}^{(2,\tilde{p})}=13$, $m=\lfloor n_{PUCCH,0}^{(2,\tilde{p})}/N_{sc}^{RB}\rfloor=0$ and $\lfloor n_{PUCCH,1}^{(2,\tilde{p})}/N_{sc}^{RB}\rfloor=1$ may be separately obtained through calculation. If timeslot numbers of the two consecutive timeslots are 0 and 1, two PRB pairs in shaded parts shown in FIG. 5a and FIG. 5b are physical uplink control channel resources allocated in this example. Optionally, one-bit indication information may be added to indicate whether two PRB pairs indicated by the two first physical uplink control channel resource indexes are located in two same consecutive timeslots or in two different consecutive timeslots. Optionally, for example, one subframe includes two timeslots. The indication information may be used to indicate whether the two PRB pairs indicated by the two first physical uplink control channel resource indexes are distributed in a same uplink subframe or distributed in two consecutive uplink subframes. For example, when the indication information is 0, physical resources corresponding to the two first physical uplink control channel resource indexes, such as the two PRB pairs in the shaded parts shown in FIG. 5a, are occupied in one subframe to send CSI. When the indication information is 1, one of physical resources corresponding to the two first physical uplink control channel resource indexes is occupied in each of two consecutive subframes to send CSI. For example, physical resources in the shaded parts shown in FIG. 5b are separately located on two PRB pairs in two consecutive uplink subframes, where a subframe L and a subframe L+1 are two consecutive uplink subframes. It should be noted that, in this application, the two consecutive uplink subframes may be inconsecutive in terms of subframe number. For example, for an uplink subframe L and an uplink subframe L+t, when t is an integer greater than 1, a non-uplink subframe such as a downlink subframe and/or a special subframe may exist between the subframe L and the subframe L+t. In this case, the uplink subframe L and the uplink subframe L+t are two uplink subframes that consecutively appear, and are still two consecutive uplink subframes in this application. When a physical uplink control channel resource is added for a single user equipment, configuration of two first physical uplink control channel resource indexes can not only improve CSI transmission reliability when required, but also maintain a correspondence between a resource index and a physical resource in the prior art, and a user terminal supporting the prior art can be used.

Figure 6:
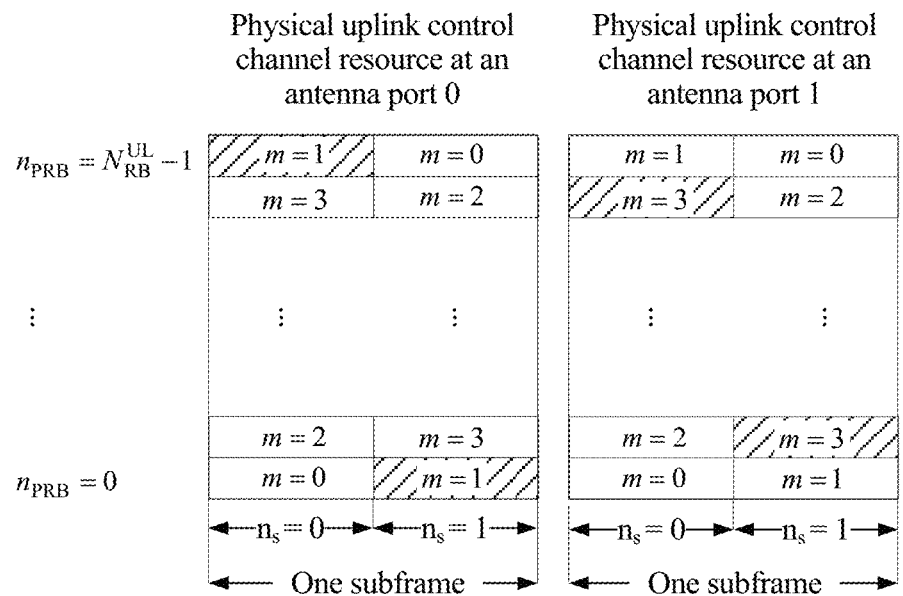
FIG. 6 is a schematic diagram of a manner of mapping a physical uplink control channel resource in another CSI feedback method according to an embodiment of this application.

In another example, the configuration message includes two first physical uplink control channel resource indexes configured by the network device for feeding back each piece of CSI. Optionally, the configuration message includes two first physical uplink control channel resource indexes configured by the network device for feeding back one piece of CSI at two antenna ports. One of the first physical uplink control channel resource indexes indicates one PRB pair. Specifically, an LTE network is used as an example. When the UE uses two antenna ports to feed back one piece of CSI, $n_{PUCCH}^{(2,0)}$ and $n_{PUCCH}^{(2,1)}$ may be respectively configured by using a cqi-PUCCH-ResourceIndex-r10 field and a cqi-PUCCH-ResourceIndexP1-r10 field in IE CQI-ReportPeriodic-r10, where $n_{PUCCH}^{(2,0)}$ indicates a first physical uplink control channel resource index at an antenna port 0, and $n_{PUCCH}^{(2,1)}$ indicates a first physical uplink control channel resource index at an antenna port 1. With reference to FIG. 6, when $n_{PUCCH}^{(2,0)}=15$ and $n_{PUCCH}^{(2,1)}=42$, $m=\lfloor n_{PUCCH}^{(2,0)}/N_{sc}^{RB}\rfloor=1$ at the antenna port 0 and $m=\lfloor n_{PUCCH}^{(2,1)}/N_{sc}^{RB}\rfloor=3$ antenna port 1 may be separately obtained through calculation. If timeslot numbers of the two consecutive timeslots are 0 and 1, two PRB pairs in shaded parts shown in FIG. 6 are physical uplink control channel resources allocated in this example.

Figure 7A:
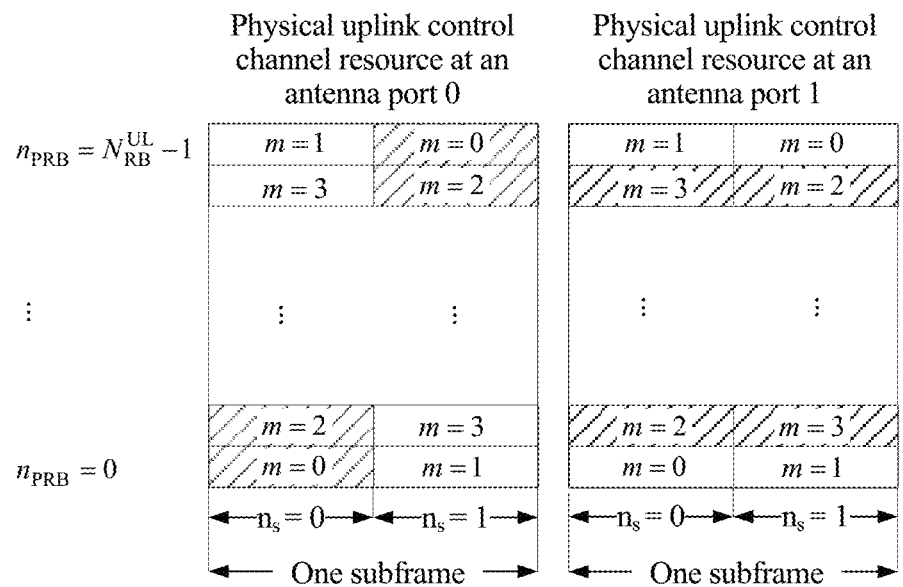
FIG. 7a and FIG. 7b are schematic diagrams of two manners of mapping a physical uplink control channel resource in still another CSI feedback method according to an embodiment of this application.
Figure 7B:
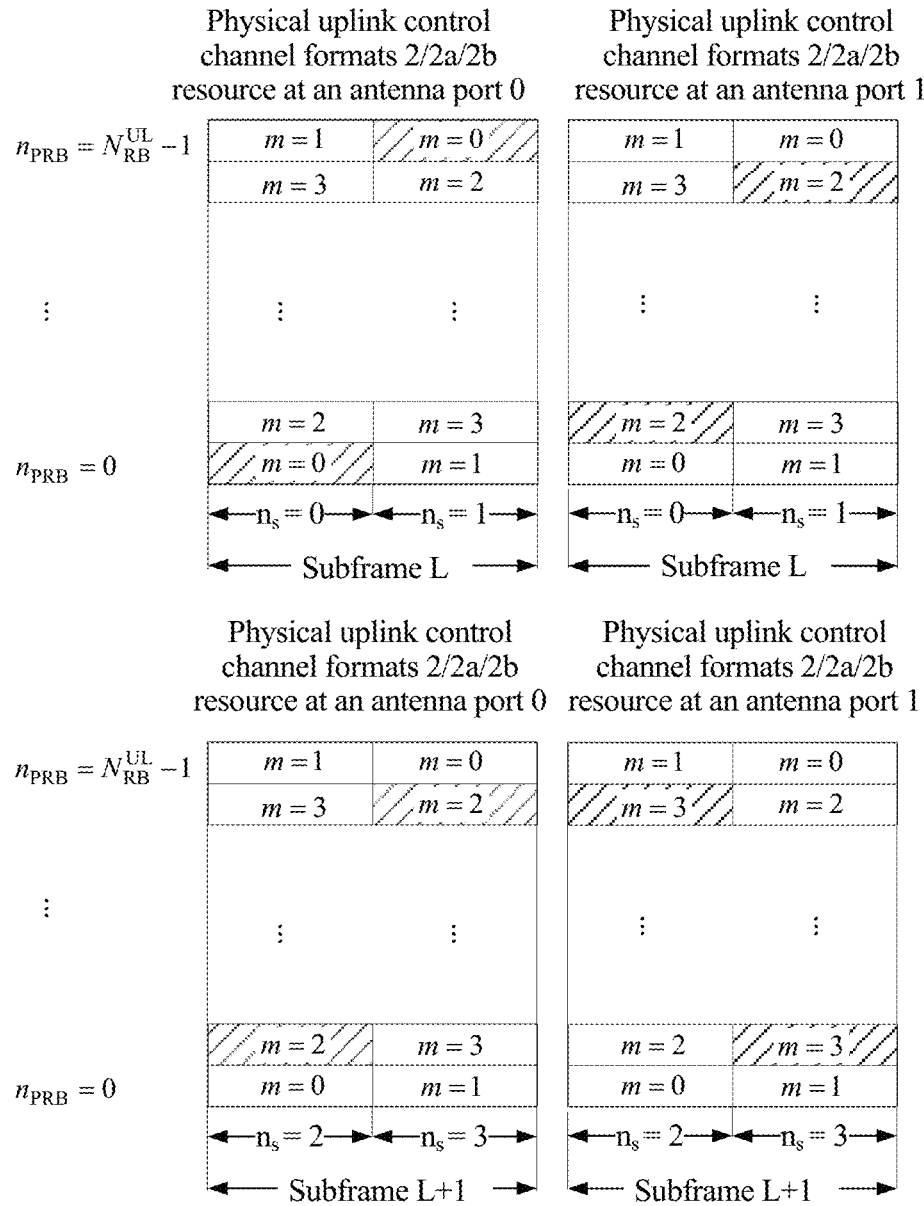

In still another example, the configuration message includes two first physical uplink control channel resource indexes configured by the network device for feeding back each piece of CSI. Optionally, the configuration message includes four first physical uplink control channel resource indexes configured by the network device for feeding back two pieces of CSI at two antenna ports. One of the first physical uplink control channel resource indexes indicates one PRB pair. Specifically, an LTE network is used as an example. When the UE uses two antenna ports to feed back two pieces of CSI, $\{n_{PUCCH,0}^{(2,0)}, n_{PUCCH,1}^{(2,0)}\}$ and $\{n_{PUCCH,0}^{(2,1)}, n_{PUCCH,1}^{(2,1)}\}$ may be respectively configured by using a cqi-PUCCH-ResourceIndex-r10 field and a cqi-PUCCH-ResourceIndexP1-r10 field in IE CQI-ReportPeriodic-r10, where $\{n_{PUCCH,0}^{(2,0)}, n_{PUCCH,1}^{(2,0)}\}$ indicates two first physical uplink control channel resource indexes at an antenna port 0, and $\{n_{PUCCH,0}^{(2,1)}, n_{PUCCH,1}^{(2,1)}\}$ indicates two first physical uplink control channel resource indexes at an antenna port 1. With reference to FIG. 7a, when $\{n_{PUCCH,0}^{(2,0)}, n_{PUCCH,1}^{(2,0)}\}=\{5,25\}$ and $\{n_{PUCCH,0}^{(2,1)}, n_{PUCCH,1}^{(2,1)}\}=\{30,40\}$, four PRB pairs at the antenna port 0 and the antenna port 1 may be separately calculated based on $m=\lfloor n_{PUCCH}^{(2,\tilde{p})}/N_{sc}^{RB}\rfloor$. If timeslot numbers of the two consecutive timeslots are 0 and 1, four PRB pairs in shaded parts shown in FIG. 7a and FIG. 7b are physical uplink control channel resources allocated in this example. Optionally, one-bit indication information may be added to indicate whether four PRB pairs indicated by the four first physical uplink control channel resource indexes are located in two same consecutive timeslots or in two different consecutive timeslots. Optionally, for example, one subframe includes two timeslots. The indication information may be used to indicate whether the four PRB pairs indicated by the four first physical uplink control channel resource indexes are located in a same subframe or distributed in two consecutive uplink subframes. For example, when the indication information is 0, physical resources corresponding to two first physical uplink control channel resource indexes configured for CSI sent at each antenna port, such as the four PRB pairs in the shaded parts shown in FIG. 7a, are in one uplink subframe. When the indication information is 1, physical resources corresponding to two first physical uplink control channel resource indexes configured for CSI sent at each antenna port are in two consecutive uplink subframes. For example, physical resources in the shaded parts shown in FIG. 7b are separately located on four PRB pairs in two consecutive subframes, where a subframe L and a subframe L+1 are two consecutive uplink subframes. It should be noted that, in this application, the two consecutive uplink subframes may be inconsecutive in terms of subframe number. For example, for an uplink subframe L and an uplink subframe L+t, when t is an integer greater than 1, a non-uplink subframe such as a downlink subframe and/or a special subframe may exist between the subframe L and the subframe L+t. In this case, the uplink subframe L and the uplink subframe L+t are two uplink subframes that consecutively appear, and are still two consecutive uplink subframes in this application.

In yet another example, the configuration message includes one second physical uplink control channel resource index configured by the network device for feeding back each piece of CSI. The second physical uplink control channel resource index indicates two PRB pairs. A single channel of a PUCCH format 2/2a/2b can carry more coded CSI bits by occupying more RBs, thereby improving CSI feedback reliability. Specifically, an LTE system is used as an example. The network device may add a field to IE CQI-ReportPeriodic and/or IE CQI-ReportPeriodic-r10 to notify the UE whether one physical uplink control channel resource index indicates one PRB pair or two PRB pairs. For example, a 1-bit field cqi-PUCCH-ResourceIndex-Type may be added. When cqi-PUCCH-ResourceIndex-Type is set to 0, it indicates that one physical uplink control channel resource index indicates one PRB pair. When cqi-PUCCH-ResourceIndex-Type is set to 1, it indicates that one physical uplink control channel resource index indicates two PRB pairs. When a single antenna port is used to send CSI, the second physical uplink control channel resource index indicating the two PRB pairs may be configured by using a cqi-PUCCH-ResourceIndex field in CQI-ReportPeriodic or a cqi-PUCCH-ResourceIndex-r10 field in CQI-ReportPeriodic-r10. When two antenna ports are used to send two pieces of CSI, one second physical uplink control channel resource index indicating two PRB pairs may be configured for each of the two antenna ports by using a cqi-PUCCH-ResourceIndex-r10 field and a cqi-PUCCH-ResourceIndex-P1-r10 field in CQI-ReportPeriodic-r10. When cqi-PUCCH-ResourceIndex-Type is set to 1, the network device uses one second physical uplink control channel resource index to configure a physical resource including two PRB pairs for a feedback of one piece of CSI. Numbers $n_{PRB}$ of two PRBs used to send a physical uplink control channel in a timeslot $n_s$ are determined by using the following formula:

$$n_{PRB} = \begin{cases} \lfloor \frac{m}{2} \rfloor, \lfloor \frac{m}{2} \rfloor + 1 & \text{if } (m+n_S \bmod 2) \bmod 2 = 0 \\ N_{RB}^{UL} - 1 - \lfloor \frac{m}{2} \rfloor, N_{RB}^{UL} - 2 - \lfloor \frac{m}{2} \rfloor & \text{if } (m+n_S \bmod 2) \bmod 2 = 1 \end{cases}.$$

Figure 8:
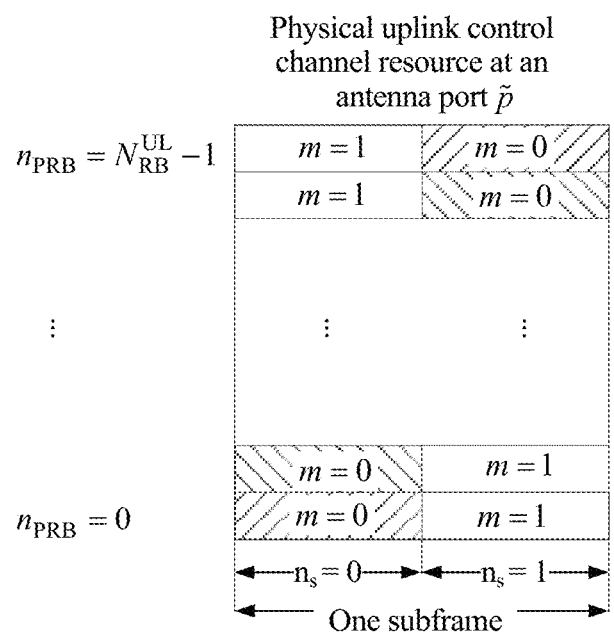
FIG. 8 is a schematic diagram of a manner of mapping a physical uplink control channel resource in yet another CSI feedback method according to an embodiment of this application.

In the formula, $N_{RB}^{UL}$ is a total quantity of RBs included in an uplink system, and $m=\lfloor n_{PUCCH}^{(2,\tilde{p})}/N_{sc}^{RB} \rfloor$. More specifically, FIG. 8 shows a manner of mapping that is between a resource index and a PRB pair and that is obtained according to the foregoing rule. It can be understood that, when two antenna ports are used to send one piece of CSI, the second physical uplink control channel resource index indicating the two PRB pairs may also be configured by using the cqi-PUCCH-ResourceIndex field in CQI-ReportPeriodic or the cqi-PUCCH-ResourceIndex-r10 field in CQI-ReportPeriodic-r10. A difference lies in that the second physical uplink control channel resource index indicating the two PRB pairs indicates one PRB pair at an antenna port 0 and one PRB pair at an antenna port 1. When such a resource configuration manner is used, the network device needs to use a downlink message to notify the UE of application of this configuration manner. In this case, locations of PRB pairs at different antenna ports may be calculated based on the embodiment shown in FIG. 3.

It should be noted that a resource index configuration manner, a form of a symbol indicating a resource index, a specific value of a resource index, and the configuration message for configuring a resource index or a specific field in the configuration message in the foregoing specific examples are all solutions provided for more clearly describing this embodiment of this application. A person skilled in the art may learn without creative efforts that there may be another specific implementation to implement this embodiment provided in this application. For example, another downlink message is used to deliver the resource index, or a field is added to an existing downlink message to deliver the resource index in this application. This is not limited in this application.

It should be noted that, for ease of description, it is assumed that one radio subframe includes two timeslots in this embodiment provided in this application and the corresponding accompanying drawings. However, the solution provided in this application may also be applied in another possible correspondence between a subframe and a timeslot, for example, one subframe includes one timeslot. This is not limited in this application.

In an example, after receiving the configuration message, the user equipment obtains the information about the physical uplink control channel resource included in the configuration message.

In a part 402, the user equipment sends CSI on the physical uplink control channel resource.

In an example, the user equipment codes an original information bit of the CSI. In another example, the user equipment jointly codes an original bit of the CSI and a 1-bit or 2-bit HARQ acknowledgement message. Using a low bit-rate modulation and coding scheme for the original information bit of the CSI can enhance CSI feedback robustness, thereby ensuring CSI transmission reliability and enhancing CSI transmission coverage. Optionally, the user equipment uses an RM (40, K) coding scheme to code the original bit of the CSI or the original bit of the CSI and an original bit of the HARQ acknowledgement message to generate 40 coded bits. RM (40, K) is a Reed-Muller coding scheme. K is an integer greater than 0, and is used to indicate a length of an original information bit. Table 1 provides a specific coding base sequence corresponding to RM (40, K). The original bit of the CSI that needs to be reported or the original bit of the CSI and the original bit of the HARQ acknowledge message that need to be reported are recorded as $a_0, a_1, a_2, a_3, \ldots, a_{K-1}$, where K is a total quantity of original bits. The LTE system is used as an example, and a specific value of K is determined based on a current feedback mode. Referring to a specific stipulation in 3GPP TS 36.212, CSI bits obtained after the RM (40, K) coding are recorded as $b_0, b_1, b_2, b_3, \ldots, b_{B-1}$, where B=40, and $$b_i = \sum_{n=0}^{K-1} (a_n \cdot M_{i,n}) \bmod 2.$$

In the formula, i indicates an index of a coded bit, i=0, 1, 2, ..., B−1, $a_n$ is a to-be-coded original bit, n is an index of an original bit, and $M_{i,n}$ is a coding base sequence of the RM (40, K) coding.

TABLE 1

Example of a coding base sequence corresponding to RM (40, K)

| i | Mi,0 | Mi,1 | Mi,2 | Mi,3 | Mi,4 | Mi,5 | Mi,6 | Mi,7 | Mi,8 | Mi,9 | Mi,10 | Mi,11 | Mi,12 |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 0 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |
| 20 | 1 | 0 | 1 | 0 | 0 | 0 | 1 | 0 | 0 | 0 | 1 | 0 | 0 |
| 21 | 1 | 1 | 0 | 1 | 0 | 0 | 0 | 0 | 0 | 1 | 1 | 0 | 0 |
| 22 | 1 | 0 | 0 | 0 | 1 | 0 | 0 | 1 | 1 | 0 | 1 | 0 | 0 |
| 23 | 1 | 1 | 1 | 0 | 1 | 0 | 0 | 0 | 1 | 1 | 1 | 0 | 0 |
| 24 | 1 | 1 | 1 | 1 | 1 | 0 | 1 | 1 | 1 | 1 | 0 | 0 | 0 |
| 25 | 1 | 1 | 0 | 0 | 0 | 1 | 1 | 1 | 0 | 0 | 1 | 0 | 0 |
| 26 | 1 | 0 | 1 | 1 | 0 | 1 | 0 | 0 | 1 | 1 | 0 | 0 | 0 |
| 27 | 1 | 1 | 1 | 1 | 0 | 1 | 0 | 1 | 1 | 1 | 0 | 0 | 0 |
| 28 | 1 | 0 | 1 | 0 | 1 | 1 | 1 | 0 | 1 | 0 | 0 | 0 | 0 |
| 29 | 1 | 0 | 1 | 1 | 1 | 1 | 1 | 1 | 1 | 0 | 0 | 0 | 0 |
| 30 | 1 | 1 | 1 | 1 | 1 | 1 | 1 | 1 | 1 | 1 | 0 | 0 | 0 |
| 31 | 1 | 0 | 0 | 0 | 0 | 0 | 0 | 0 | 0 | 0 | 0 | 0 | 0 |
| 32 | 1 | 1 | 0 | 0 | 0 | 0 | 0 | 0 | 0 | 0 | 1 | 1 | 0 |
| 33 | 1 | 1 | 1 | 0 | 0 | 0 | 0 | 0 | 1 | 1 | 1 | 1 | 0 |
| 34 | 1 | 0 | 0 | 1 | 0 | 0 | 1 | 0 | 1 | 1 | 1 | 1 | 1 |
| 35 | 1 | 0 | 1 | 1 | 0 | 0 | 0 | 0 | 1 | 0 | 1 | 1 | 1 |
| 36 | 1 | 1 | 1 | 1 | 0 | 0 | 0 | 1 | 0 | 0 | 1 | 1 | 1 |
| 37 | 1 | 1 | 0 | 0 | 1 | 0 | 1 | 1 | 1 | 0 | 1 | 1 | 1 |
| 38 | 1 | 0 | 1 | 0 | 1 | 0 | 1 | 0 | 1 | 1 | 1 | 1 | 1 |
| 39 | 1 | 0 | 0 | 1 | 1 | 0 | 0 | 1 | 1 | 0 | 1 | 1 | 1 |

It should be noted that Table 1 is merely used as an example of an RM (40, K) coding base sequence, and another base sequence obtained through transformation based on Table 1, for example, an exchange of row elements and/or column elements, may also be used as the RM (40, K) coding base sequence. Alternatively, another coding scheme may be used to obtain the 40 coded bits. This is not limited in this application.

Optionally, the user equipment may scramble a coded CSI bit or a coded CSI bit and a coded HARQ acknowledgement message bit. The LTE system is used as an example. The scrambling may be performed according to a specific stipulation in 3GPP TS 36.211. A difference lies in that a length of a coding sequence that needs to be scrambled is 40 in this embodiment.

In an example, the user equipment modulates the coded CSI bit or the coded CSI bit and the coded HARQ acknowledgement message bit. Optionally, the user equipment may modulate the CSI bit or the CSI bit and the HARQ acknowledgement message bit into 20 quadrature phase shift keying (QPSK) symbols. Using a low bit-rate modulation and coding scheme for the original information bit of the CSI can enhance CSI feedback robustness, thereby ensuring CSI transmission reliability and enhancing CSI transmission coverage.

In an example, the user equipment spreads the 20 symbols obtained after modulating the CSI or the CSI and the HARQ acknowledgement message.

The LTE system is used as an example. In a specific example, two PRB pairs corresponding to a feedback of each piece of CSI are configured by using two first physical uplink control channel resource indexes. Alternatively, when two antenna ports are used to send one piece of CSI, two PRB pairs corresponding to a feedback of each piece of CSI are configured by using one second physical uplink control channel resource index. Every 10 symbols in the 20 symbols are grouped into one group for respective spreading operations. A symbol grouping manner is not limited in this application. For example, the first 10 symbols may be selected as one group, and the last 10 symbols belong to another group; or 10 symbols may be randomly selected as one group, and 10 remaining symbols belong to another group. For ease of description, a group of 10 symbols is recorded as $d(0), \ldots, d(9)$. $d(0), \ldots, d(9)$ and a sequence $r_{u,v}^{(\alpha_{\tilde{p}})}(i)$ whose length is $N_{seq}^{PUCCH}$ and whose phase rotation is $\alpha_{\tilde{p}}(n_s,l)$ are spread at the antenna port $\tilde{p}$. A sequence obtained after the spreading is $$z^{(\tilde{p})}(N_{seq}^{PUCCH} \cdot n + 1) = \frac{1}{\sqrt{P}} d(n) \cdot r_{u,v}^{(\alpha_{\tilde{p}})}(i)$$

$$n = 0, 1, \ldots, 9$$

$$i = 0, 1, \ldots, N_{sc}^{RB} - 1.$$

In the formula, d(n) is a to-be-spread symbol, n is an index of the symbol, P is a quantity of antenna ports, and $N_{sc}^{RB}$ is a quantity of subcarriers included in each PRB and is equal to 12. The sequence $r_{u,v}^{(\alpha_{\tilde{p}})}(i)$ is a pilot sequence defined in the 3GPP TS 36.211 protocol, and a length of the sequence is 12. The phase rotation $\alpha_{\tilde{p}}(n_s,l)$ is obtained through calculation based on a physical uplink control channel resource index $n_{PUCCH}^{(2,\tilde{p})}$ by using the following formula:

$\alpha_{\tilde{p}}(n_s,l)=2\pi \cdot n_{cs}^{(\tilde{p})}(n_s,l)/N_{sc}^{RB}$, where $n_{cs}^{(\tilde{p})}(n_s,l)=(n_{cs}^{cell}(n_s,l)+n'_{\tilde{p}}(n_s)) \bmod N_{sc}^{RB}$.

When $n_s \bmod 2=0$, $n'_{\tilde{p}}(n_s) = \begin{cases} n_{PUCCH}^{(2,\tilde{p})} \bmod N_{sc}^{RB} & \text{if } n_{PUCCH}^{(2,\tilde{p})} < N_{sc}^{RB} N_{RB}^{(2)} \\ (n_{PUCCH}^{(2,\tilde{p})} + N_{cs}^{(1)} + 1) \bmod N_{sc}^{RB} & \text{otherwise} \end{cases}$ When $n_s \bmod 2=1$, $n'_{\tilde{p}}(n_s) = \begin{cases} [N_{sc}^{RB}(n'_{\tilde{p}}(n_s-1)+1)] \bmod(N_{sc}^{RB}+1)-1 & \text{if } n_{PUCCH}^{(2,\tilde{p})} < N_{sc}^{RB} N_{RB}^{(2)} \\ (N_{sc}^{RB}-2-n_{PUCCH}^{(2,\tilde{p})}) \bmod N_{sc}^{RB} & \text{otherwise} \end{cases}$ In the formula, $n_s=0, 1, 2 \ldots 19$ indicates a timeslot number, l indicates a number of a symbol in a subframe, and $l=0, 1, 2, \ldots, N_{symb}^{UL}-1$. For a normal cyclic prefix, a value of $N_{symb}^{UL}$ is 7; for an extended CP, a value of $N_{symb}^{UL}$ is 6. $N_{cs}^{(1)}$ indicates a quantity of PRB cyclic shifts used to send a PUCCH format 1 in a PRB combining the PUCCH format 1 and the PUCCH format 2/2a/2b, and may be configured by using an nCS-AN field in IE PUCCH-ConfigCommon in an radio resource control (RRC) message. $N_{RB}^{(2)}$ indicates a quantity of PRBs that can be used to send the PUCCH format 2/2a/2b in a base station. $N_{RB}^{(2)}$ may be configured by using an nRB-CQI field in IE PUCCH-ConfigCommon in the RRC message. $n_{cs}^{cell}(n_s,l)$ is a cell-level scrambling sequence, and is determined by using the following formula:

$n_{cs}(n_s,l)=\Sigma_{i=0}^{7} c(8N_{symb}^{UL} \cdot n_s+8l+i) \cdot 2^i$

For a specific definition of a pseudo-random sequence c(j) (where j is an index of a specific element in the pseudo-random sequence, and corresponding to the foregoing formula, j is obtained by calculating $8N_{symb}^{UL} \cdot n_s+8l+i$), refer to a stipulation in 3GPP TS 36.211. The pseudo-random sequence is initialized at the start of each frame. An initialization parameter is $c_{init}=n_{ID}^{RS}$, and $n_{ID}^{RS}$ may be configured by using an nPUCCH-Identity-r11 field in IE PUCCH-ConfigDedicated-v1130 in the RRC message. $n_{symb}^{UL}$ is a quantity of symbols in an uplink timeslot. For the normal cyclic prefix, the value of $N_{symb}^{UL}$ is 7; for the extended CP, the value of $N_{symb}^{UL}$ is 6.

The LTE system is used as an example. In another specific example, two PRBs corresponding to a feedback of each piece of CSI are configured by using one second physical uplink control channel resource index, and the 20 symbols are spread together. Each modulation symbol d(0), ..., d(19) and a sequence $r_{u,v}^{(\alpha_{\tilde{p}})}(i)$ whose length is $N_{seq}^{PUCCH}=24$ and whose phase rotation is $\alpha_{\tilde{p}}(n_s,l)$ are spread at the antenna port $\tilde{p}$. A spread sequence is obtained based on a symbol d(0), d(2), ..., d(18) by using the following formula:

$z^{(\tilde{p})}(N_{seq}^{PUCCH} \cdot n + i) = \frac{1}{\sqrt{P}} d(n) \cdot r_{u,v}^{(\alpha_{\tilde{p}})}(i)$ where, $n = 0, 2, 4, 6, 8, 10, 12, 14, 16, 18$ $i = 0, 1, \ldots, N_{sc}^{RB} - 1$.

A spread sequence is obtained based on a symbol d(1), d(3), ..., d(19) by using the following formula:

$z^{(\tilde{p})}(N_{seq}^{PUCCH} \cdot n + i) = \frac{1}{\sqrt{P}} d(n) \cdot r_{u,v}^{(\alpha_{\tilde{p}})}(i)$ where, $n = 1, 3, 5, 7, 9, 11, 13, 15, 17, 19$ $i = N_{sc}^{RB}, N_{sc}^{RB} + 1, \ldots, 2 * N_{sc}^{RB} - 1$.

In the formula, d(n) is a to-be-spread symbol, n is an index of the symbol, P is a quantity of antenna ports, and $N_{RB}^{sc}$ is a quantity of subcarriers included in each PRB and is equal to 12. The sequence $r_{u,v}^{(\alpha_{\tilde{p}})}(i)$ is a pilot sequence defined in the protocol. For details, refer to a stipulation in 3GPP TS 36.211. A difference from the foregoing embodiment lies in that a length of the sequence is 24 in this embodiment. The phase rotation $\alpha_{\tilde{p}}(n_s,l)$ is obtained through calculation based on a physical uplink control channel resource index $n_{PUCCH}^{(2,\tilde{p})}$ by using the following formula:

$\alpha_{\tilde{p}}(n_s,l)=2\pi \cdot n_{cs}^{(\tilde{p})}(n_s,l)/N_{sc}^{RB}$, where $n_{cs}^{(\tilde{p})}(n_s,l)=(n_{cs}^{cell}(n_s,l)+n'_{\tilde{p}}(n_s)) \bmod N_{sc}^{RB}$.

When $n_s \bmod 2=0$, $n'_{\tilde{p}}(n_s)=n_{PUCCH}^{(2,\tilde{p})} \bmod 2N_{sc}^{RB}$.

When $n_s \bmod 2=1$, $n'_{\tilde{p}}(n_s)=[N_{sc}^{RB}(n'_{\tilde{p}}(n_s-1)+1)] \bmod(2N_{sc}^{RB}+1)-1$.

In the formula, $n_s=0, 1, 2 \ldots 19$ indicates a timeslot number, l indicates a number of a symbol in a subframe, and $l=0, 1, 2, \ldots, N_{symb}^{UL}-1$. For a normal cyclic prefix, a value of $N_{symb}^{UL}$ is 7; for an extended CP, a value of $N_{symb}^{UL}$ is 6. $n_{cs}^{cell}(n_s,l)$ is a cell-level scrambling sequence, and is determined by using the following formula:

$n_{cs}^{cell}(n_s,l)=\Sigma_{i=0}^{7} c(8N_{symb}^{UL} \cdot n_s+8l+i) \cdot 2^i$.

For a specific definition of a pseudo-random sequence c(j) (where j is an index of a specific element in the pseudo-random sequence, and corresponding to the foregoing formula, j is obtained by calculating $8N_{symb}^{UL} \cdot n_s+8l+i$), refer to a stipulation in 3GPP TS 36.211. The pseudo-random sequence is initialized at the start of each frame. An initialization parameter is $c_{init}=n_{ID}^{RS}$, and $n_{ID}^{RS}$ may be configured by using an nPUCCH-Identity-r11 field in IE PUCCH-ConfigDedicated-v1130 in the RRC message. It can be understood that the foregoing spreading manner is merely an example, and the 20 symbols may be spread in another spreading manner in the prior art. This is not limited in this application.

In an example, the user equipment sends half of the symbols of the modulated CSI or half of the symbols of the modulated CSI and the modulated HARQ acknowledgement message on each PRB pair. In a specific example, the UE uses a single antenna port to send one piece of CSI, and sends half of the 20 symbols on each of the two PRB pairs. In another specific example, the UE uses two antenna ports to send one piece of CSI, and sends half of the 20 symbols on one PRB pair at each antenna port. In still another specific example, the UE uses two antenna ports to send two pieces of CSI, and sends half of 20 symbols of any piece of CSI on one of the two PRB pairs at each antenna port. For example, half of 20 symbols of a first piece of CSI is sent on a first PRB pair at the antenna port 0, half of 20 symbols of a second piece of CSI is sent on a second PRB pair at the antenna port 0, the other half of the 20 symbols of the first piece of CSI is sent on a first PRB pair at the antenna port 1, and the other half of the 20 symbols of the second piece of CSI is sent on a second PRB pair at the antenna port 1. It should be noted that a manner of selecting half of 20 symbols of one piece of CSI is not limited in this application. For example, the first 10 symbols may be selected as one group, and the last 10 symbols belong to another group; or 10 symbols may be randomly selected as one group, and 10 remaining symbols belong to another group. It can be understood that half of the 20 symbols may be separately spread, or may be spread together with the other half of the symbols.

In an example, the network device receives, on a corresponding physical resource, the CSI fed back by the user equipment, and performs one or more corresponding operations including demodulation, descrambling, and decoding on the received CSI to obtain the original information bit of the CSI.

Figure 9:
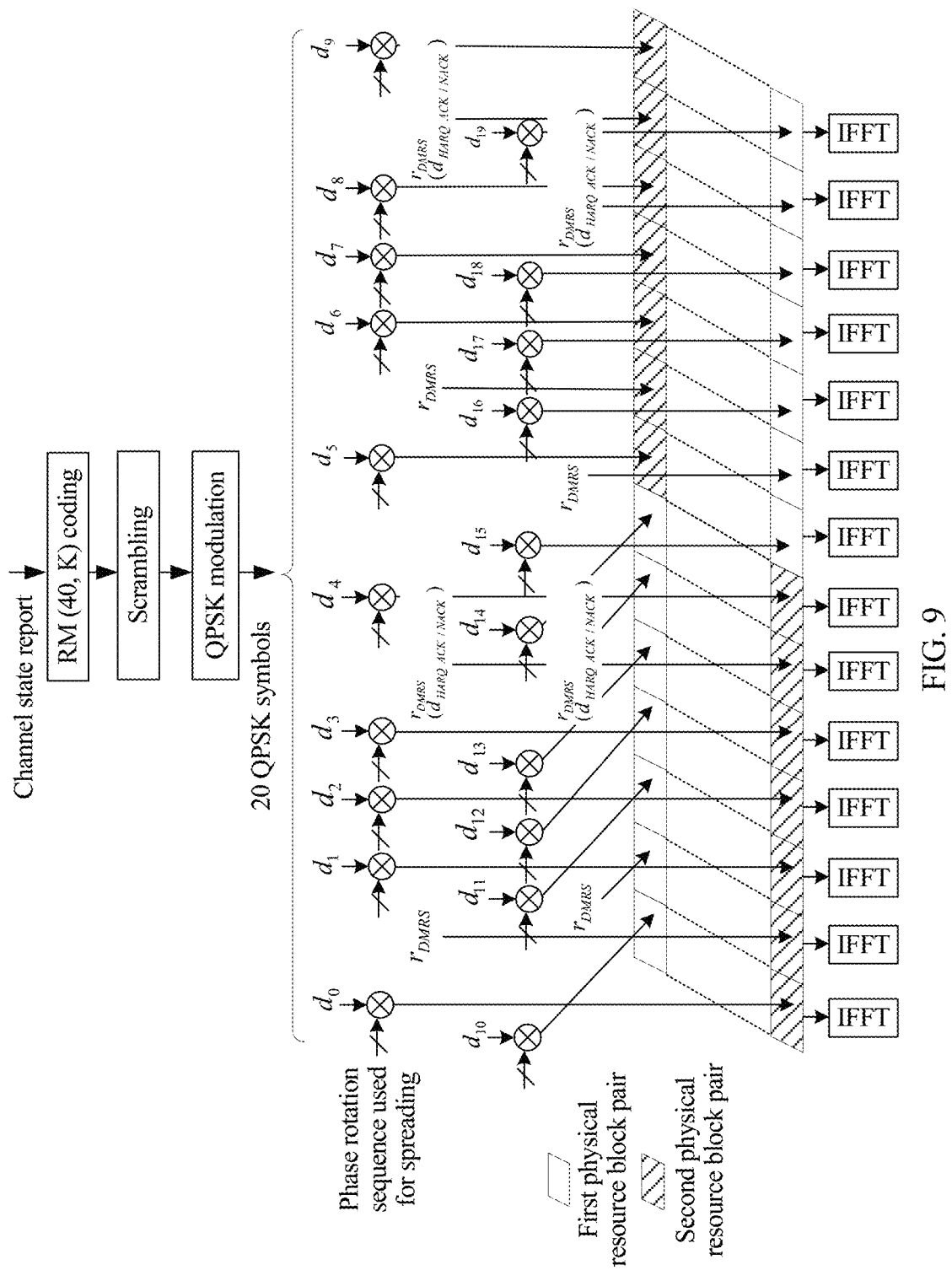
FIG. 9 is a schematic flowchart of data processing in a CSI feedback method according to an embodiment of this application.

FIG. 9 is a schematic flowchart of data processing in a CSI feedback method according to an embodiment of this application.

First, user equipment performs RM (40, K) coding on an original information bit of CSI in a channel state report, or on an original bit of the CSI and an original bit of a HARQ acknowledgement message to generate 40 coded bits. For a specific coding scheme, refer to the description of coding in the part 402 in the embodiment. Details are not described herein again.

Then the user equipment scrambles the coded bits. For a specific scrambling manner, refer to the description of scrambling in the part 402 in the embodiment. Details are not described herein again.

Then the user equipment modulates the scrambled coded bits into 20 QPSK symbols, d(0), . . . , d(19) that is, shown in the figure.

Then the user equipment separately spreads d(0), . . . , d(19) by using a phase rotation sequence used for spreading. For a specific spreading manner, refer to the description of spreading in the part 402 in the embodiment. Details are not described herein again.

Then the user equipment separately maps the 20 spread QPSK symbols to allocated physical resources. Specifically, an LTE system is used as an example. FIG. 9 shows a case in which an antenna port includes two PRB pairs used to feed back CSI in a case of a normal CP. For a PUCCH format 2, each timeslot has $N_{symb}^{UL}=7$ symbols in a case of a normal CP, symbol 2 and symbol 6 in each timeslot are used to transmit a demodulation reference signal (DMRS), that is, $r_{DMRS}$ in the figure, and five remaining symbols are used to transmit the PUCCH format 2; each timeslot has only $N_{symb}^{UL}=6$ symbols in a case of an extended CP, only symbol 4 in each timeslot is used to transmit a DMRS, and five remaining symbols are used to transmit the PUCCH format 2. One-bit or two-bit HARQ ACK/NACK message carried in PUCCH formats 2a/2b may be separately modulated. BPSK modulation is performed on 1-bit HARQ ACK/NACK, and QPSK modulation is performed on 2-bit HARQ ACK/NACK. Finally, one modulation signal $d_{HARQACK/NACK}$ is obtained. The ACK is coded as '1', and the NACK is coded as '0'. In the case of the normal CP, $d_{HARQACK/NACK}$ may be modulated into a second DMRS of each timeslot. For a specific modulation scheme, refer to a stipulation in 3GPP TS 36.211. A difference lies in that, when one piece of CSI is corresponding to two PRB pairs, the HARQ ACK/NACK may be correspondingly mapped to DMRSs of the two PRB pairs. It should be noted that, for clarity of illustration, in FIG. 9, d(0), . . . , d(9) is mapped to a second PRB pair, and d(10), . . . , d(19) is mapped to a first PRB pair. In an actual operation, another mapping manner may be used. For details, refer to the description of sending, by the user equipment on each PRB pair, half of the symbols of the CSI that is modulated into 20 symbols in the part 402 in the embodiment. Details are not described herein again.

Finally, the user equipment performs IFFT transformation on each symbol to generate an SC-FDMA symbol, performs intermediate radio frequency processing on the SC-FDMA symbol, and then sends the processed symbol by using an antenna.

Figure 10:
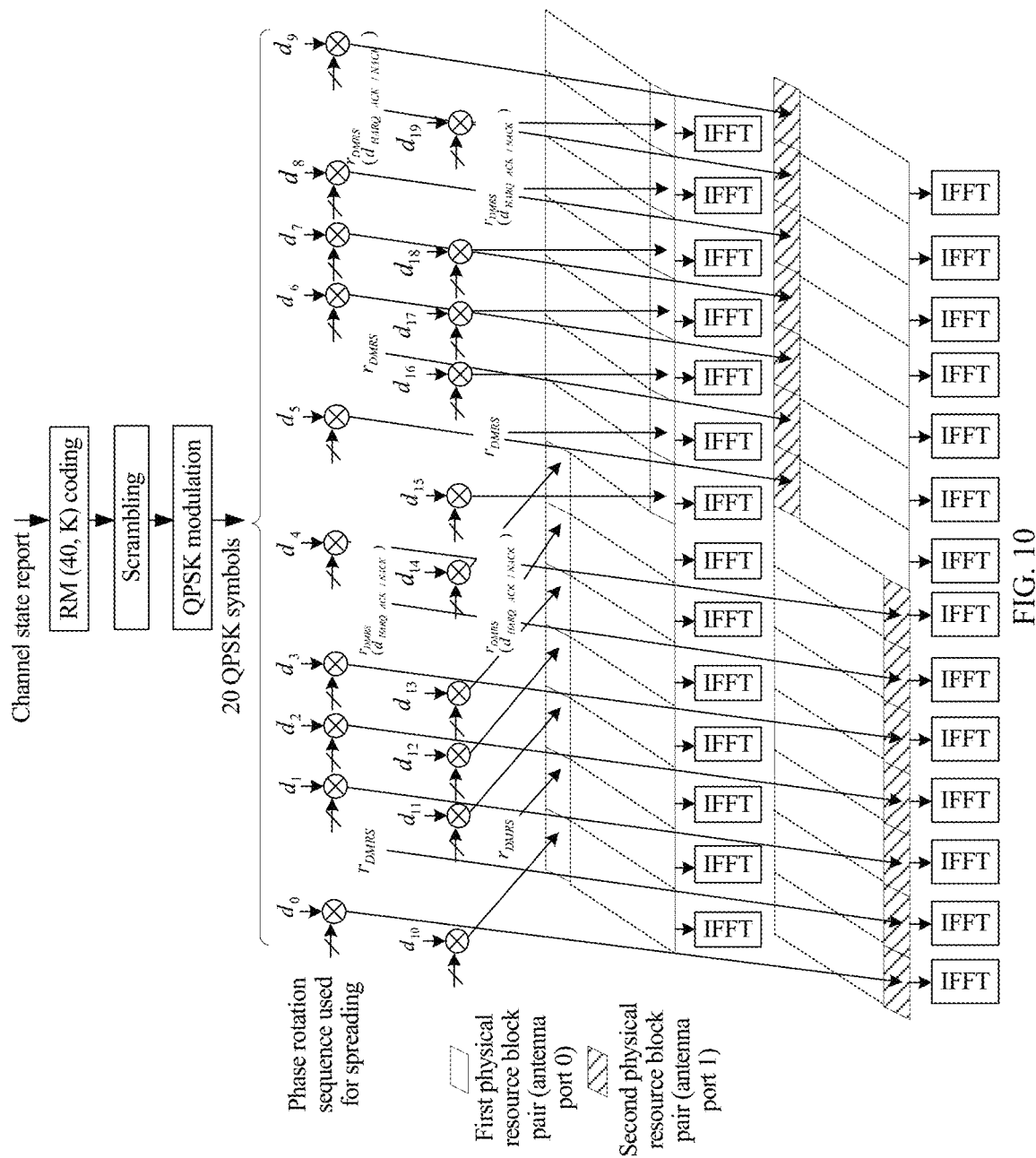
FIG. 10 is a schematic flowchart of data processing in another CSI feedback method according to an embodiment of this application.

FIG. 10 is a schematic flowchart of data processing in another CSI feedback method according to an embodiment of this application.

Methods for implementing coding, scrambling, modulation, and spreading in FIG. 10 are the same as those in FIG. 9. Details are not described herein again. A difference lies in that, FIG. 10 shows a case in which UE uses two antenna ports to send one piece of CSI, and each antenna port includes one PRB pair used to feed back CSI. For clarity of illustration, in FIG. 10, d(0), . . . , d(9) is mapped to a second PRB pair at an antenna port 1, and d(10), . . . , d(19) is mapped to a first PRB pair at an antenna port 0. In an actual operation, another mapping manner may be used. For details, refer to the description of sending, by the user equipment on each PRB pair, half of the symbols of the CSI that is modulated into 20 symbols in the part 402 in the embodiment. Details are not described herein again. After physical resource mapping, the user equipment separately performs IFFT transformation on symbols at different antenna ports to generate SC-FDMA symbols, performs intermediate radio frequency processing on the SC-FDMA symbols, and then sends the processed symbols by using an antenna.

Figure 11:
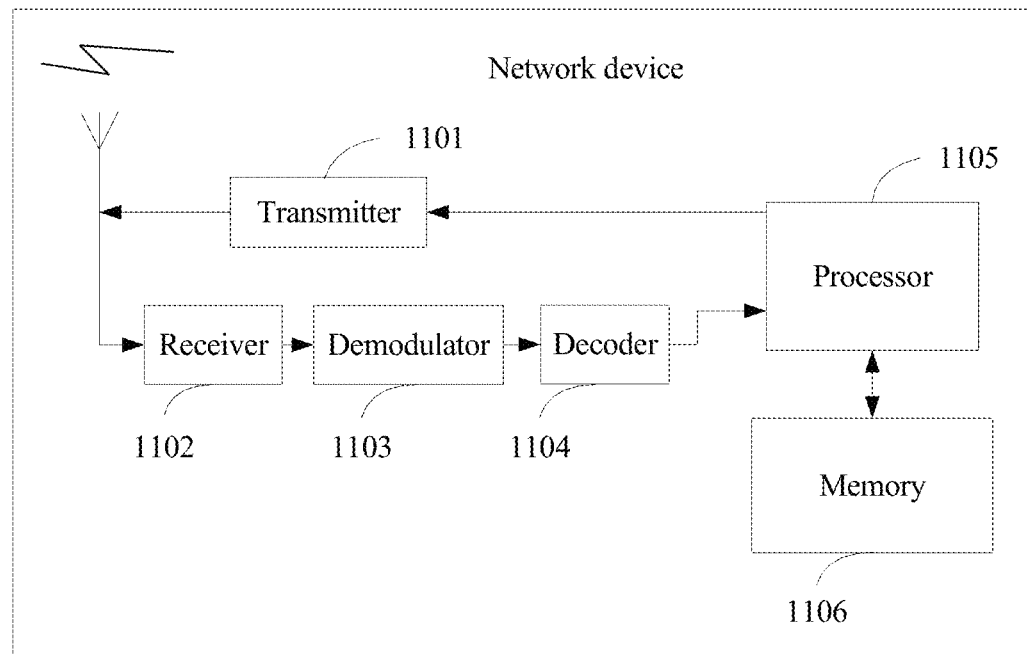
FIG. 11 is a schematic structural diagram of a network device according to an embodiment of this application.

FIG. 11 is a possible schematic structural diagram of the network device in the foregoing embodiment.

In an example, a structure of the network device includes a transmitter and a receiver. In an example, the structure of the network device may further include a demodulator and/or a decoder. In an example, the network device may further include a processor. In an example, the structure of the network device may further include an interface unit, configured to support communication with another network device, for example, communication with a core network node. In an example corresponding to FIG. 11, the structure of the network device in this application includes a transmitter 1101, a receiver 1102, a demodulator 1103, a decoder 1104, a processor 1105, and a memory 1106.

The transmitter 1101 and the receiver 1102 are configured to support information receiving and sending between the network device and the UE in the foregoing embodiment. The demodulator 1103 is configured to support the network device in performing the demodulation operation in the foregoing embodiment. The decoder 1104 is configured to support the network device in performing the decoding operation or the descrambling and decoding operations in the foregoing embodiment. The processor 1105 performs various functions for communicating with the UE. In downlink, service data and a signaling message are processed by the processor 1105, and then are processed by the transmitter 1101 to generate a downlink signal, and the downlink signal is transmitted to the UE by using an antenna. In uplink, an uplink signal from the UE is received by using the antenna, processed by the receiver 1102, further despread, demodulated, descrambled, and decoded by the demodulator 1103 and the decoder 1104, and finally processed by the processor 1105 to restore service data and signaling information sent by the UE. The processor 1105 further performs the processing processes related to the network device in FIG. 3 to FIG. 10. The memory 1106 is configured to store program code and data of the network device.

It can be understood that FIG. 11 shows only a simplified design of the network device. In actual application, the network device may include any quantity of transmitters, receivers, processors, memories, and the like, and all network devices that can implement this application fall within the protection scope of this application.

In another example, the structure of the network device in this application includes a transmitter, a receiver, a processor, and a memory. Different from the example shown in FIG. 11, the network device in this example does not include a decoder or a demodulator. Functions of the decoder and/or the demodulator in the example shown in FIG. 11 may be implemented by the receiver or the processor in this example. A function of another structure in this example is the same as that in the example shown in FIG. 11. Details are not described herein again.

Figure 12:
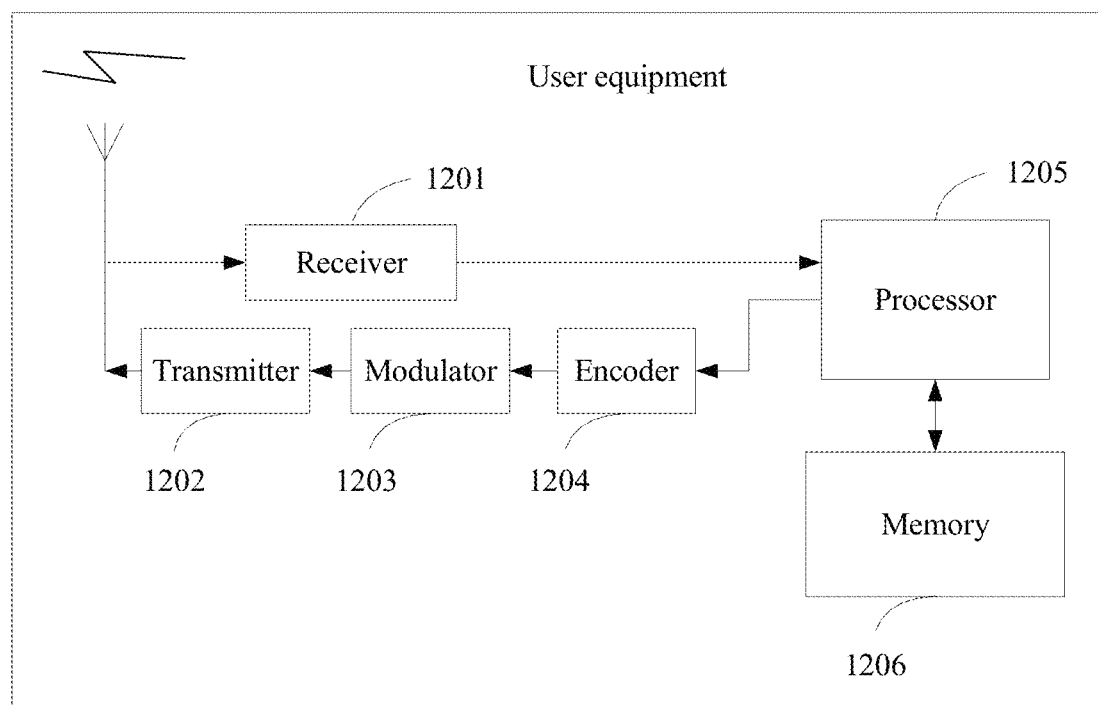
FIG. 12 is a schematic structural diagram of user equipment according to an embodiment of this application.

FIG. 12 is a simplified schematic diagram of a possible design structure of the UE in the foregoing embodiment. In an example, a structure of the user equipment includes a receiver and a transmitter. In an example, the user equipment may further include an encoder and/or a modulator. In an example, the user equipment may further include a processor. In an example corresponding to FIG. 12, the structure of the user equipment in this application includes a receiver 1201, a transmitter 1202, a modulator 1203, an encoder 1204, a processor 1205, and a memory 1206.

In uplink, to-be-sent service data or a signaling message is coded or coded and scrambled by the encoder 1204, modulated or modulated and spread by the modulator 1203, and then adjusted by the transmitter 1202 to output a sample and generate an uplink signal. The uplink signal is transmitted to the network device in the foregoing embodiment by using an antenna. In downlink, the antenna receives a downlink signal transmitted by the network device in the foregoing embodiment. The receiver 1201 adjusts the signal received from the antenna, and provides an input sample. It can be understood that functions of the modulator 1203 and/or the encoder 1204 may be alternatively completed by the transmitter 1202 or the processor 1205. The processor 1205 processes the service data and the signaling message. These units perform processing based on a radio access technology (for example, an access technology in LTE or another evolved system) used by a radio access network. The processor 1205 is further configured to perform control management on an action of the UE, and configured to perform processing performed by the UE in the foregoing embodiment. For example, the processor 1205 is configured to control the UE to receive downlink information and/or perform, based on the received downlink information, another process in the technology described in this application. In an example, the processor 1205 is configuration to support the UE in performing the processing processes related to the UE in FIG. 3 and FIG. 10. The memory 1206 is configured to store program code and data of the UE.

In another example, the structure of the user equipment in this application includes a transmitter, a receiver, a processor, and a memory. Different from the example shown in FIG. 12, the user equipment in this example does not include an encoder or a modulator. Functions of the encoder and the modulator in the example shown in FIG. 12 may be completed by the transmitter or the processor in this example. A function of another structure in this example is the same as that in the example shown in FIG. 12. Details are not described herein again.

Method or algorithm steps described in combination with the content disclosed in this application may be implemented by hardware, or may be implemented by a processor by executing a software instruction. The software instruction may be formed by a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in user equipment or a network device. Certainly, the processor and the storage medium may exist in the user equipment or a network device as discrete components.

A person skilled in the art should be aware that in the foregoing one or more examples, functions described in this application may be implemented by hardware, software, firmware, or any combination thereof. When this application is implemented by software, these functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of this application are further described in detail in the foregoing specific implementations. It should be understood that the foregoing descriptions are merely specific implementations of this application, but are not intended to limit the protection scope of this application. Any modification, equivalent replacement or improvement made based on the technical solutions in this application shall fall within the protection scope of this application.

What is claimed is:

1. A channel state information (CSI) feedback method, the method comprising:

sending, by a network device, a configuration message to a user equipment, wherein the configuration message comprises information about a physical uplink control channel resource configured for feeding back channel station information (CSI) of the user equipment, the physical uplink control channel resource comprising two physical resource block (PRB) pairs, each PRB pair comprising two PRBs distributed in two timeslots, the two PRBs being configured to transmit a physical uplink control channel, and each of the timeslots comprising one of the two PRBs, wherein the information about the physical uplink control channel resource indicates whether the two timeslots are two same consecutive timeslots or two different consecutive timeslots; and receiving, by the network device, the CSI sent by the user equipment on the physical uplink control channel resource.

2. The method according to claim 1, further comprising:
demodulating, by the network device, the CSI that is modulated into 20 quadrature phase shift keying (QPSK) symbols, or the CSI and a hybrid automatic repeat request (HARQ) acknowledgement message that are modulated into 20 QPSK symbols.

3. The method according to claim 1, further comprising:
decoding, by the network device, the CSI on which RM (40, K) coding is performed, or the CSI and the HARQ acknowledgement message on which RM (40, K) coding is performed, wherein RM (40, K) is a Reed-Muller coding scheme, and K is an integer greater than 0.

4. The method according to claim 1, wherein the network device receives half of the symbols of the CSI or half of the symbols of the CSI and the HARQ acknowledgement message on one of the PRB pairs.

5. The method according to claim 1, wherein
the configuration message comprising information about a physical uplink control channel resource configured for feeding back the CSI of the user equipment comprises one of the following cases:
the configuration message comprises two first physical uplink control channel resource indexes configured by the network device for feeding back the CSI; or
the configuration message comprises one second physical uplink control channel resource index configured by the network device for feeding back the CSI; and, wherein
one of the first physical uplink control channel resource indexes indicates one PRB pair, and the second physical uplink control channel resource index indicates two PRB pairs.

6. A channel state information (CSI) feedback method, the method comprising:
receiving, by a user equipment, a configuration message to a user equipment, wherein the configuration message comprises information about a physical uplink control channel resource configured for feeding back channel station information (CSI) of the user equipment, the physical uplink control channel resource comprising two physical resource block (PRB) pairs, each PRB pair comprising two PRBs distributed in two timeslots, the two PRBs being configured to transmit a physical uplink control channel, and each of the timeslots comprising one of the two PRBs, wherein the information about the physical uplink control channel resource indicates whether the two timeslots are two same consecutive timeslots or two different consecutive timeslots; and
sending, by the user equipment, the CSI on the physical uplink control channel resource.

7. The method according to claim 6, further comprising:
performing, by the user equipment, RM (40, K) coding on an original bit of each piece of CSI, or on an original bit of the CSI and an original bit of a hybrid automatic repeat request (HARQ) acknowledgement message, wherein RM (40, K) is a Reed-Muller coding scheme, and K is an integer greater than 0.

8. The method according to claim 6, further comprising:
modulating, by the user equipment, the CSI, or the CSI and the HARQ acknowledgement message into 20 quadrature phase shift keying (QPSK) symbols.

9. The method according to claim 6, further comprising:
sending, by the user equipment, half of the symbols of the CSI or half of the symbols of the CSI and the HARQ acknowledgement message on one of the PRB pairs.

10. The method according to claim 6, wherein the configuration message comprising information about a physical uplink control channel resource configured for feeding back the CSI of the user equipment comprises one of the following cases:
the configuration message comprises two first physical uplink control channel resource indexes configured for feeding back the CSI; or
the configuration message comprises one second physical uplink control channel resource index configured for feeding back the CSI; and,
wherein one of the first physical uplink control channel resource indexes indicates one PRB pair, and the second physical uplink control channel resource index indicates two PRB pairs.

11. A user equipment, comprising:
a receiver, configured to receive a configuration message to a user equipment, wherein the configuration message comprises information about a physical uplink control channel resource configured for feeding back channel station information (CSI) of the user equipment, the physical uplink control channel resource comprising two physical resource block (PRB) pairs, each PRB pair comprising two PRBs distributed in two timeslots, the two PRBs being configured to transmit a physical uplink control channel, and each of the timeslots comprising one of the two PRBs, wherein the information about the physical uplink control channel resource indicates whether the two timeslots are two same consecutive timeslots or two different consecutive timeslots; and
a transmitter, configured to send the CSI on the physical uplink control channel resource.

12. The user equipment according to claim 11, further comprising:
an encoder, configured to perform RM (40, K) coding on each piece of the CSI, or on the CSI and a hybrid automatic repeat request (HARQ) acknowledgement message, wherein RM (40, K) is a Reed-Muller coding scheme, and K is an integer greater than 0.

13. The user equipment according to claim 11, further comprising:
a modulator, configured to modulate the CSI, or the CSI and the HARQ acknowledgement message into 20 quadrature phase shift keying (QPSK) symbols.

14. The user equipment according to claim 11, wherein the transmitter is configured to send half of the symbols of the CSI or half of the symbols of the CSI and the HARQ acknowledgement message on one of the PRB pairs.

15. The user equipment according to claim 11, further comprising:
a processor, configured to parse the information about the physical uplink control channel resource comprised in the configuration message, wherein the information about the physical uplink control channel resource comprised in the configuration message comprises one of the following cases:
the configuration message comprises two first physical uplink control channel resource indexes configured for feeding back the CSI; or
the configuration message comprises one second physical uplink control channel resource index configured for feeding back the CSI; and, wherein one of the first physical uplink control channel resource indexes indicates one PRB pair, and the second physical uplink control channel resource index indicates two PRB pairs.

\* \* \* \* \*